US 007792722B2

(12) United States Patent
Joye et al.

(10) Patent No.: US 7,792,722 B2
(45) Date of Patent: Sep. 7, 2010

(54) DATA PROCESSING SYSTEM AND METHOD INCORPORATING FEEDBACK

(75) Inventors: Christopher Ronald Edward Joye, Bellevue Hill (AU); Sean Oldfield, Bondi (AU); Glen Geoffrey Bertram, Collaroy Plateau (AU)

(73) Assignee: ARES Capital Management Pty Ltd, Sydney (AU)

( * ) Notice: Subject to any disclaimer, the term of this patent is extended or adjusted under 35 U.S.C. 154(b) by 638 days.

(21) Appl. No.: 11/248,253

(22) Filed: Oct. 13, 2005

(65) Prior Publication Data

US 2006/0089895 A1 Apr. 27, 2006

Related U.S. Application Data

(60) Provisional application No. 60/630,580, filed on Nov. 26, 2004.

(30) Foreign Application Priority Data

Oct. 13, 2004 (AU) .............................. 2004905922
Sep. 29, 2005 (AU) .............................. 2005905383

(51) Int. Cl.
*G06Q 40/00* (2006.01)
(52) U.S. Cl. .................................................... 705/35
(58) Field of Classification Search ............. 705/35, 705/36 R, 37, 38, 39
See application file for complete search history.

(56) References Cited

U.S. PATENT DOCUMENTS

| 5,083,270 | A | * | 1/1992 | Gross et al. ................... 705/35 |
| 5,644,726 | A | * | 7/1997 | Oppenheimer ............. 705/36 R |
| 5,689,650 | A | * | 11/1997 | McClelland et al. ....... 705/36 R |
| 5,819,237 | A | * | 10/1998 | Garman ..................... 705/36 R |
| 5,875,437 | A | * | 2/1999 | Atkins ......................... 705/40 |
| 5,950,175 | A | * | 9/1999 | Austin ...................... 705/36 R |
| 5,983,206 | A | * | 11/1999 | Oppenheimer ............... 705/38 |
| 6,012,047 | A | * | 1/2000 | Mazonas et al. .............. 705/38 |
| 6,018,722 | A | * | 1/2000 | Ray et al. ................. 705/36 R |
| 6,278,981 | B1 | * | 8/2001 | Dembo et al. ............. 705/36 R |
| 6,345,262 | B1 | * | 2/2002 | Madden ....................... 705/38 |
| 6,393,409 | B2 | * | 5/2002 | Young et al. ................. 705/37 |

(Continued)

FOREIGN PATENT DOCUMENTS

WO WO99/46658 9/1999

(Continued)

OTHER PUBLICATIONS

International Search Report and PCT Written Opinion for Int'l Appl. No. PCT/AU2005/001586 mailed Jan. 18, 2006 (7 pages).

*Primary Examiner*—Alexander Kalinowski
*Assistant Examiner*—Bruce I Ebersman
(74) *Attorney, Agent, or Firm*—Finnegan, Henderson, Farabow, Garrett & Dunner, LLP.

(57) ABSTRACT

A data processing system and method are disclosed which finds particular application to equity finance mortgages. An Overall System (600) is formed from a Target Investment System (100), an Asset Origination System (200), an Asset Securitization System (400), an Asset Servicing System (300) and an Asset Management System (500). Financial feedback is applied to ensure targets are achieved. Mortgages are pooled and on-sold to investors and selected for acceptance on the basis of preferences expressed by the investors.

28 Claims, 6 Drawing Sheets

U.S. PATENT DOCUMENTS

| | | | |
|---|---|---|---|
| 6,601,044 B1* | 7/2003 | Wallman | 705/36 R |
| 6,904,414 B2* | 6/2005 | Madden | 705/38 |
| 7,412,414 B2* | 8/2008 | Michaud et al. | 705/36 R |
| 2002/0128963 A1* | 9/2002 | Madden | 705/38 |
| 2003/0028467 A1* | 2/2003 | Sanborn | 705/36 |
| 2003/0110122 A1* | 6/2003 | Nalebuff et al. | 705/38 |
| 2003/0163347 A1* | 8/2003 | Shaw et al. | 705/1 |
| 2004/0083150 A1* | 4/2004 | Michaud et al. | 705/36 |
| 2004/0220872 A1* | 11/2004 | Pollock, III | 705/38 |
| 2004/0230506 A1* | 11/2004 | Casco-Arias et al. | 705/35 |
| 2004/0230512 A1* | 11/2004 | Gulati | 705/36 |
| 2005/0027632 A1* | 2/2005 | Zeitoun et al. | 705/36 |
| 2005/0108134 A1* | 5/2005 | Harlow et al. | 705/36 |
| 2005/0149431 A1* | 7/2005 | Delaney | 705/38 |
| 2005/0154658 A1* | 7/2005 | Bove et al. | 705/35 |
| 2006/0015364 A1* | 1/2006 | Hays | 705/1 |
| 2006/0089895 A1* | 4/2006 | Joye et al. | 705/35 |
| 2006/0271473 A1 | 11/2006 | Pollock, III et al. | |
| 2007/0299673 A1* | 12/2007 | Weyts et al. | 705/1 |
| 2007/0299753 A1* | 12/2007 | Averbuch et al. | 705/35 |
| 2008/0167999 A1* | 7/2008 | Morazan | 705/36 R |

FOREIGN PATENT DOCUMENTS

| | | |
|---|---|---|
| WO | WO01/75738 | 10/2001 |
| WO | WO2004/019167 | 3/2004 |

* cited by examiner

DATA PROCESSING SYSTEM AND METHOD INCORPORATING FEEDBACK

CROSS REFERENCE TO RELATED APPLICATIONS:

This application is related to, and claims the benefits of U.S. Provisional Application No. 60/630,580, filed Nov. 26, 2004, by Joye, Oldfield, and Bertram; Australian Application No. 2004-905-922, filed Oct. 13, 2004, by Joye, Oldfield, and Bertram; and Australian Application No. 2005-905-383, filed Sep. 29, 2005, by Joye, Oldfield, and Bertram, all of which are hereby incorporated herein by reference. This application is also related to U.S. Provisional Application No. 60/572,606, filed May 19, 2004, by Joye, Oldfield, and Pollock, which is hereby incorporated herein by reference.

FIELD OF THE INVENTION

The present invention relates to a data processing system and method which utilize computer generated digitally encoded electric waveforms in the implementation of novel financial systems and methods. In the description contained herein, the invention is primarily concerned with state-or collateral-dependent financing arrangements (typically debt contracts) over real estate assets, and the new data processing systems and methods required to screen, select, process, securitise and portfolio manage such financial arrangements. However, the application of the invention is not, as such, restricted to either debt instruments or real estate assets. The invention can be applied to many different types of financial arrangements over a significant number of asset categories (e.g. commodities or human capital).

COPYRIGHT NOTICE

This document contains material which is subject to copyright. The applicant as copyright owner has no objection to the reproduction of this patent document in its entirety as it appears in the Patent Office files or records, but otherwise reserves all copyright rights whatsoever.

BACKGROUND ART

The global mortgage industry has evolved over the last 50 years at great pace. This has been particularly the case with the advent of the process of "securitisation", whereby bundles of mortgages are packaged together and sold on to third-parties, thereby liberating the balance sheets of banks to engage in a new round of cost-effective lending. This has in turn led to the development of liquid secondary markets in mortgage-backed securities that are actively traded by investors all around the world.

Innovation in the primary mortgage market has, however, been relatively stilted. Since the turn of the $20^{th}$ century, global housing finance has been dominated by either fixed-rate or variable-rate mortgage instruments. While there has been some innovation on the periphery of these products (e.g., interest-only contracts, home-equity loans, etc), this has not resulted in fundamental changes to the way in which consumers finance their home ownership choices.

Perhaps the one exception here is the "reverse mortgage", in which the mortgage's interest rate compounds or "rolls-up" over time, thereby enabling the consumer to defer the cost of the finance until the time that they either die or sell their property. Under a reverse mortgage, there are not, therefore, any ongoing interest and principal payments to which the consumer is subject. Reverse mortgages are, furthermore, limited in their application to a specific class of consumers: namely, the elderly. Indeed, the providers of these products quite explicitly prevent consumers under the age of, typically, 65 from qualifying for such loans. In addition, reverse mortgages are not used to purchase new properties: on the contrary, they are restricted for use as "equity-release" mechanisms for those asset-rich yet cash-poor owner-occupiers who are currently living in their own residence. Reverse mortgages are not, as a consequence, relevant to the traditional housing finance industry. As a final point, reverse mortgages are—in their own way—simple interest-bearing securities that appeal to fixed income investors only. Reverse mortgages do not in any manner whatsoever provider the lender (or, in the event of securitisation, a third-party investor) with any exposure to the risks and returns associated with changes in the value of the underlying properties over which the mortgages are held (i.e., the residential real estate asset-class).

In 2003, a landmark government report in Australia (see C. Joye, A. Caplin, E. Glaeser, P. Butt, M. Kucynski (2003) New Approaches to Reducing the Costs of Homeownership; A Report for the Prime Minister's Homeownership Taskforce, Menzies Research Centre) unlocked the door to a new universe of housing finance possibilities, with particular emphasis placed on allowing consumers to draw on the "equity" side of the home ownership balance sheet while at the same time supplying institutional investors with efficient access to the residential real estate asset-class for the very first time. This was in effect a vastly more advanced suite of proposals to the many (mostly distant) arrangements that have been suggested in both the professional and academic worlds.

There has for some time existed various cottage-industry style shared-equity programs (almost exclusively in the academic and public sectors in Australia, the UK, the US, and New Zealand) targeting faculty and low-income households, in addition to isolated incidences of so-called "shared-appreciation" mortgages in the private sector in the UK and US. There has not, however, ever been a successful example of an enduring market-based programme in which significant numbers of consumers have shared the long-term economic exposures to their owner-occupied homes with similarly large numbers of external investors. The 2003 Australian Prime Minister's Home Ownership Task Force Report (hereafter "the Report") outlines merely the conceptual architecture through which such a market could be developed.

In particular, that Report argues that while for centuries businesses in need of funds have been able to avail themselves of both debt and equity, households that aspire to expand have been restricted to the use of mortgage finance. And so, despite the ever-growing sophistication of corporate capital markets, consumers around the world have been forced to use only the crudest of financial instruments. The Report contends that the implications of this deficiency vary from the merely inconvenient to the extremely tragic. Suffice to say that many of the grave economic complications that are manifest throughout the course of an occupier's life-cycle can be attributed to the "all-or-nothing constraint" on home ownership (i.e., the fact that households must retain 100% of the equity in their homes, and are prevented from sharing their investment in the residential real estate asset with third-parties).

The Report describes how this all-or-nothing constraint on home ownership (also referred to as the "indivisibility" of the housing asset) plagues consumers right throughout the life-cycle. For example, young families scramble to scrape together funds for a down payment so that they can graduate from the difficulties of rental accommodation to the suggested nirvana of owner-occupation. This period of intense saving often induces a considerable consumption squeeze and severely constrains lifestyle choices. In fact, the bulk of young households in some countries are obliged to commit around 70% of all their wealth to one highly illiquid and very volatile asset—residential real estate. Then there are the costs associated with servicing the mortgage and maintaining the home. The weight of such commitments frequently forces families to endure Spartan-like conditions in the early to middle years—the so-called "house poor". In later life, most manage to pay off all their debts and live in the home clear and free. Unfortunately, by this time retirement beckons and the majority of dwellers have precious little income (other than an old age pension). They are now "asset rich, but cash poor". Indeed, a significant proportion of the elderly populate the lowest two income quintiles.

In an attempt to rectify the asymmetry between corporate and household capital markets, the Report proposes that contemporary arrangements could be augmented by a more flexible system that would furnish families with the option of using both "debt" and synthetic "equity" finance when purchasing their properties. Under the Report's proposal, housing would be financed by using a traditional mortgage in combination with synthetic equity capital, contributed by the same or a separate lender via a "state- or collateral-dependent" debt contract, whereby the normal interest rate is replaced by an entitlement or claim to the future positive and/or negative price movements associated with changes in the value of the underlying property over which the debt instrument is held (hence the "state-dependence"). The Report claims that these "equity finance" arrangements could give rise to, amongst other things: a 30% plus reduction in the upfront costs of home ownership; an increase in the consumer's disposable income once they move into their home (as a result of the diminished debt servicing obligations); a reduction in their risk of default given the smaller size of their traditional mortgage; and a material increase in the household's liquid wealth at retirement since they no longer have to dedicate most of their savings to the otherwise illiquid and inaccessible dwelling asset. And so, whereas this household might once have been priced out of the market, the Report maintains that the use of equity finance has made home ownership a much more realistic ambition.

The Report also claims that the use of equity finance would constitute a safer equity-release mechanism for the asset-rich yet cash-poor elderly (who represent an increasingly large proportion of the population) in comparison to reverse mortgages. The Report posits that it is an unfortunate fact that the illiquidity of housing equity obliges many aged individuals to select between two starkly different paths. They either: (1) continue to teeter on the precipice of poverty, while retaining the right to occupy the home that they have cherished for so long; or (2), alleviate these monetary woes by selling their current abode, moving to a smaller one, and possibly jeopardising relationships that have been defined by the area in which they live. The advantage implied by the latter option is of course an improvement in the homeowner's otherwise dim consumption prospects.

The Report notes that the equity-release opportunity has not gone unnoticed by members of the financial community. In fact, there have been several attempts to provide home owners with a vehicle through which they can liberate wealth held in the form of housing. These include products such as reverse mortgages, shared-appreciation mortgages, and home-equity loans. Notwithstanding the recent growth in reverse mortgages, the success of these offerings has been a slow-paced affair, to say the least. The majority of older dwellers spent their middle years constrained by the creditor's leash, and they are understandably reluctant to burden themselves with any additional debt (at least in its conventional incarnation). At the same time, many choose not to trade down to a smaller home, since this usually requires them to move to an entirely different geography, which then raises the spectre of sacrificing social ties that are predicated on the locational proximity of the two parties. These strong psychological bonds to the current property can create a substantial roadblock to higher levels of consumption—so much so that most financial planners tend to ignore the owner-occupied home when assessing the resources available for use in later life.

In light of the above, the Report argues that there is little doubt that by eliminating the "indivisibility" of the dwelling asset (i.e., by way of sharing the equity entitlements with third-parties) one could open up a new realm of possibilities for elderly occupiers. In contrast to many of the alternatives, the Report submits that collateral-dependent equity finance offers elderly owners three particularly attractive attributes: (1) it prevents them from having to move from their current homes and incur all of the associated emotional stress; (2) they do not have to assume traditional debt; and, most importantly, (3) in comparison to a reverse mortgage, equity finance instruments leave consumers, in the worst possible contingencies, with a significant share of the equity in their home. Reverse mortgages, on the other hand, would expose these same borrowers to the risk that the ever-growing loan amount will eventually balloon out to consume 100% of the value of their homes, thereby subjecting them to the spectre of little, or even negative, equity.

Another important advantage afforded by equity finance is the valuable insurance service the lender supplies by sharing a proportion of the downside risk (i.e. the risk of property price declines). The simple fact is that most homeowners own one house, situated on one street, pointing one direction, with all its manifest peculiarities. Indeed, economists estimate that the "idiosyncratic" risk attributable to a single-family home is more than two to three times that which one would impute to a well-diversified portfolio of property (and of course, the use of large amounts of leverage only serves to magnify these hazards).

The Report's equity finance instrument was designed such that when the housing market declines, the cost of capital is low, while when it booms, it is comparatively high (which is obviously ideal from the consumer's perspective). That is to say, if there is no price appreciation, households are not obliged to make any economic transfers to the lending institution or individual (or synthetic equity provider) over and above the original loan amount—certainly a superior outcome to paying interest on a massive mortgage. In the event that there is price depreciation (as was the case in the early 1990s), households benefit from being able to redistribute some of these risks to the investor. All other forms of debt finance (including reverse mortgages), by way of contrast, offer no such flexibility, and as such are clearly distinguished from equity finance mortgages.

While the case for investors is complex, it would appear to be just as attractive. Residential real estate is, after all, the largest asset class on earth, valued at $70 trillion in developed countries alone. Since 1960, it has outperformed stocks, bonds and real estate investment trusts on a risk-adjusted basis. It is also a highly "uncorrelated" investment category, which could provide prospective participants with significant diversification gains. The experience of the stock market crashes of 1987 and 2001 are a classic case in point: while global equities suffered significant losses, owner-occupied housing in Australia, Europe and North America delivered tremendous price appreciation. And so, if institutions could spread their eggs among a greater number of baskets, they would be able to appreciably increase (decrease) portfolio returns (risk) while holding risk (returns) constant. Of course, it is currently impossible to access real estate's risk-return profile in a well-diversified fashion or to trade home equity on a liquid market.

While the Report provides an impressive articulation of the equity finance opportunity and outlines the skeletal features of how these arrangements might practically develop, it does not specify the precise contractual solutions to more fundamental issues associated with the economic pricing of the equity finance contract, including for example, prepayment by consumers who want to stay in their homes, the refinancing of the traditional interest-bearing mortgage with which it is to be bundled, and owner initiated renovations to the property that serves as the contract's underlying collateral. Consequently, on the consumer side of the equity finance ledger (i.e., setting aside the capital markets challenges for the time being), the Report did not provide comprehensive proposals as to how one could confidently solve crucial problems associated with "adverse selection" (e.g., borrowers who prepay their equity finance instruments to the detriment of the lender) and "moral hazard" (e.g., borrowers who do not seek to maximise the value of their properties, or engage in behaviour that detracts from its future sale proceeds). The Report is also silent on the critical technological systems that would enable the lenders of both the traditional interest-bearing mortgage and the equity finance instrument to avoid conflicts of interest and thereby interact advantageously.

On the capital markets front, the Report once again sketches out the broad nature of the equity finance opportunity, while shedding no light on the methods, systems, and technologies that the distributors, lenders, underwriters and/or funders of these equity finance contracts must use in order to identify, screen, select, securitise, and service such assets, and manage the overall portfolios into which they are placed on an ongoing basis through time, in order to enable a successful and self-perpetuating interaction between the consumer and investor sides of the equity finance market.

The many otherwise intractable commercial problems highlighted above have motivated the present developments.

There have been a number of private and public sector programmes that have tried to implement arrangements somewhat similar to the equity finance initiative of the abovementioned Report.

In 1987, the US Congress created the Home Equity Conversion Mortgage ("HECM") Insurance Demonstration Program under the National Housing Act to: (1) facilitate the conversion of home equity into liquid assets to meet the needs of elderly home owners; (2) encourage and increase participation of the mortgage markets in this process; and (3), determine the extent of demand for home equity conversion and the types of mortgages that would best serve the needs of aged individuals. Under the HECM Program, elderly home owners could assume a reverse mortgage secured by the equity in their residence. As the borrower receives payments, the amount of debt tied to the mortgage rises over time. This debt is non-recourse, with the implication that only the value of the dwelling may serve as collateral, and other personal assets cannot be seized if this value is not sufficient to pay off the loan.

Originally authorised by Congress to insure 2,500 reverse mortgages through to September 1991, the Department of Housing and Urban Development ("HUD") designed the demonstration program in consultation with other federal agencies and implemented it with a Final Rule in July 1989. The next year, Congress extended the demonstration through to 1995 and expanded HUD's authority to insure 25,000 mortgages. It subsequently amended the program again to authorise HUD to insure up to 50,000 mortgages through to Sep. 30, 2000. And in October 1998, Congress increased the number of allowable outstanding loans to 150,000.

Yet for reasons outlined previously, such interest-bearing reverse mortgages—which afford the lender no access to the risks and returns associated with the underlying property—are very different to equity finance instruments.

In the US also, state and time-dependent shared "appreciation" mortgages ("SAMs") were developed in response to the inflationary pressures experienced during the 1970s, and are the nearest that the prior art approaches the "upside" and "downside" collateral-dependent equity finance mortgage techniques disclosed herein. When the general price level rises, there is a front-end loading of interest payments in standard mortgage instruments. That is, inflation causes nominal rates of interest to rise while simultaneously driving down the real value of outstanding debt. A SAM reduces the extent of this front-end loading by enabling users to pay lower rates of time-dependent interest today in exchange for investors receiving a collateral-dependent share of the inflation-induced increase in the value of housing in the future.

The SAMs offered in the US were relatively short term (generally 10 years in duration), and combined sizeable cuts in interest payments with a substantial sharing of appreciation. One product in particular presented households with a 6% per annum interest rate concession in return for a contingent claim on 40% of the appraised price growth. Very few such instruments were in fact issued, in part because of their nebulous tax treatment. The primary mandate of the IRS of the USA is to collect tax and prevent tax avoidance. Regrettably, this seems to have coloured its attitude when called to rule upon the prickly subject of whether a SAM entitles householders to mortgage interest deductions. In the end, in 1983 the IRS decided (somewhat reluctantly, if one reads between the lines) that both the fixed and contingent interest payments on a specific SAM product were indeed tax deductible). The ruling was deliberately narrow, and as a further sign of inertia, the IRS has twice since announced that it would not issue any additional determinations on the subject, most recently in 1996.

The consequences of the IRS's attitude towards the classic SAM continue to ripple throughout the US housing market to this day. There was of late, for instance, a well-funded and researched attempt to launch just such an instrument, with the National Commerce Bank Services ("NCBS") of Memphis offering to acquire contracts from local issuers in the Southeastern states, and Bear Stearns undertaking to sell the securitised bonds. Yet the product was withdrawn almost immediately, in a large part because of ongoing questions about the stance of the IRS. To illustrate the manifest ambiguity, consider the advice NCBS offered to potential clients.

"The application of the federal income tax rules to a SAM is both uncertain and complicated, and the rules will affect each borrower differently. Accordingly, you must talk to your tax advisor about the consequences of borrowing under a SAM."

The Reverse Mortgage Advisor Volume 3.2 (Spring 2000) edition contained the following statement about another shared-appreciation type product, developed by Financial Freedom, with the standard time-dependent interest element, "The new product, called the home appreciation loan ("HAL"), is still under development and may be unveiled in the third quarter of this year. The HAL would have many characteristics of a reverse mortgage. For example, a borrower could take the loan proceeds as a lump sum, and the loan wouldn't have to be repaid until the borrower dies or sells the home. The repayment obligation would be the loan amount borrowed, plus accrued interest and a predetermined percentage share of the home appreciation during the loan period, which would be negotiated upfront between Financial Freedom and each borrower. The greater the percentage, the larger the loan size. For example, if a borrower's home was valued at $150,000 when the HAL was made, and the home was sold five years later for $180,000, the borrower would have to pay Financial Freedom a percentage of the $30,000 gain from the sale of the home." As of the priority date of the present application, there has been no commercialization of the proposed product by Financial Freedom, or its parent, Lehman Brothers.

More recently, bankers, employers, local governments, and not-for-profit organisations have launched shared appreciation products in many of America's most expensive housing markets, from Howard County, Maryland to San Diego, Calif. These contracts generally have one common element: instead of a SAM replacing the conventional first mortgage, as in the experiments of the 1980s, the scheme supplements it, usually in the form of a second mortgage or, in one case, a co-ownership agreement (with respect to the latter, see also U.S. Pat. No. 5,983,206 for example of a mortgage combined with a joint venture equity partner). Typically, an equity source provides 20 to 25% of the purchase price (in one programme this percentage has risen to 50%) in exchange for a similar share of the appreciation at point of sale. The remainder of the acquisition costs are financed by a small down payment and a conventional first mortgage of 70 to 75% of the home value.

These initiatives have usually been implemented as either public-purpose programmes to help low-to-moderate income families or as employer-sponsored schemes to assist employees acquire a home (the latter of which is most prevalent among universities in comparatively expensive markets such as Harvard, MIT, Stanford and the University of Colorado). As such, it is not surprising that most have operated on a small scale, producing at best only a few thousand financing arrangements nationwide. They do not appear to be shaped in a way that can attract significant private capital for two basic reasons: (1) the current design does not give rise to returns that would be high enough to appeal to outside investors—equity partners do not normally receive any premium for giving up the decision-making rights, nor do they receive any rental yield that would usually arise in the context of a direct equity investment in residential real estate; and (2), the existing programmes do not share a common contractual structure, with different parameters on everything from duration, to repayment formulas, to the legal structure. As a consequence, these efforts have not spurred the emergence of a tradable financial instrument commodity in housing equity, which would provide the homogeneity that the secondary markets so desperately seek.

In 1996, Northbay Family Homes, a not-for-profit organisation in the San Francisco Bay Area, developed a product known as the Community-Assisted Shared Appreciation ("CASA") contract. Unlike its peers, CASA has attracted considerable investment from banks, development firms, and other private entities that supplement the government funding. The investors obtain an equity stake in the house in the form of a second mortgage, which is then backed up by the local authorities with a third mortgage. The second and third mortgages each equal 10% of the sales price, for a total equity investment of 20%. Both the investor and the government agency get their funds back when the home owner sells the property. If the occupiers have not sold after 14 years, they are required to refinance and buy out the investors if they can afford to do so. Significantly, when the house is disposed of, the family receives 40% of the appreciation, while the equity partners collect 60% (most of which goes to the private institutions). Due to the high prices in the San Francisco area, this initiative has proved to be extremely popular with residents.

Indeed, all of these CASA programmes have experienced demand that has been much greater than the available supply. In Howard County, for instance, a recent financing round for nine buyers attracted 347 applicants. Part of the reason demand has exceeded supply is that most schemes have offered financing on exceptionally favourable terms as a result of the flexibility afforded by public finding. But the fact that even the CASA program has galvanised strong demand shows that there exists the potential for a much larger consumer market than is presently the case.

In all of the above cases, the state-dependent nature of the shared-appreciation mortgage instrument is confined exclusively to one area: events in which the value of the house increases. As a consequence, the cost of capital borne by the consumer is not in any way affected by events in which the value of the property declines. Lenders under these arrangements apparently have not conceived of a situation in which they would be willing to share any of the "risks" associated with home ownership. Put differently, they have not thought of offering households an "upside" and "downside" collateral-dependent mortgage (or, simply, an "equity finance mortgage") arrangement where a proportion of the principal amount would actually be forgiven in the event that the price of the property falls, in addition to foregoing or not foregoing all other forms of time-dependent interest. In many respects, this downside risk sharing component of the mortgage contract disclosed herein resembles an insurance service, insofar as it seeks to limit the occupier's exposure to contingencies in which they would suffer a wealth loss. While many people would have one believe that residential real estate is an incredibly safe investment, at the individual home owner level nothing could be further from the truth. The simple fact is that a very large number of households realise both nominal and real losses when they come to sell their homes. And yet in the current housing finance market, there is nothing that they can do about it—that is to say, they are forced to assume 100% of all the economic risks inherent in owning a home.

SUMMARY OF THE INVENTION

In accordance with a first aspect of the present invention there is disclosed a data processing system to enable an entity to use a range of decision-rules to evaluate in real time or on a batch basis applications from consumers to enter into financial arrangements with a financing entity for financial accommodation in which an asset is used as collateral, with an ultimate objective of said entity accepting or rejecting those applications, said system comprising:

(i) at least one data input terminal in which is input data relating to both the consumer and the financial accommodation applied for, (ii) a data processing means connected with the or each of said input terminals, and (iii) a data storage means connected with said data processing means and containing both initial portfolio data relating to said applications accepted to date which collectively characterise a financial portfolio of said financing entity, and desiderata data relating to desired characteristics of said portfolio, wherein said data processing means amalgamates said input data and said portfolio data to produce a modified portfolio data representative of said portfolio if said application were accepted and compares said modified portfolio data with said desiderata data and signals acceptance of said application only if the difference between said desiderata data and said modified portfolio data is less than the difference between said desiderata data and said initial portfolio data.

In accordance with a second aspect of the present invention there is disclosed a method of accepting, rejecting or referring in real time or on a batch basis applications from consumers to a financing entity for financial accommodation in which an asset is used as collateral, said method comprising the steps of:
(i) inputting into a data input terminal data relating to both the consumer and said financial accommodation, said data input terminal being connected to a data processing means to which is connected a data storage means,
(ii) storing in said data storage means both initial portfolio data relating to said applications accepted to date which collectively characterise a financial portfolio of said financing entity, and desiderata data relating to desired characteristics of said portfolio,
(iii) amalgamating said input data and said initial portfolio data to produce a modified portfolio data representative of said portfolio if said application were accepted,
(iv) comparing said modified portfolio data with said desiderata data, and
(v) accepting said application only if the difference between said desiderata data and said modified portfolio data is less than the difference between said desiderata data and said initial portfolio data.

In accordance with a third aspect of the present invention there is disclosed a financial system for sourcing capital from third-parties providers and using that capital for the purposes of funding financial arrangements in which an asset is used as collateral that supply financial accommodation to a multiplicity of consumers each of which enters into one of said financial arrangements, wherein said financial arrangements are entered into only in respect of selected consumers and/or selected collateral assets based upon one or more characteristics of said collateral assets and/or consumers, and said characteristics are initially determined and/or modified over time based upon expressed preferences of said third-party providers of said capital.

In accordance with a fourth aspect of the present invention there is disclosed a computer implemented financial system for maintaining a close approximation between an actual pool of investments and a desired pool of investments, said system having an investment mandate specifying target values for a plurality of investment characteristics each of which is stored in a memory bank operated by said system, said system further having a data store in which is maintained the actual values of said plurality of investment characteristics of said actual pool of investments, said system comparing the values in said memory bank and said data store, and permitting as additions to said actual pool of investments only those additional investments having investment characteristics which reduce the difference between said target values and said actual values.

In accordance with a fifth aspect of the present invention there is disclosed a computer implemented financial system for maintaining a close approximation between an actual pool of investments and a desired pool of investments, said investment pool comprising financial arrangements each between a consumer seeking financial accommodation and an entity willing to provide such financial accommodation, said system having an investment mandate specifying target values for a plurality of investment characteristics each of which is stored in a memory bank operated by said system, said system further having a data store in which is maintained the actual values of said plurality of investment characteristics of said actual pool of investments, said system comparing the values in said memory bank and said data store, and altering the obligations of each said consumer under said financial arrangements to reduce the difference between said target values and said actual values.

In accordance with a sixth aspect of the present invention there is disclosed a method of accepting, rejecting or referring in real time or on a batch basis a request for re-financing approval from mortgagors having both a substantially conventional interest-bearing mortgage with a first financial institution and a second wholly or partially collateral-dependent mortgage with a second financial institution, said request for re-financing approval being made to said second financial institution and both said mortgages being secured over the same property, said method comprising the steps of:
(i) inputting into a data input terminal a new value of said property arising from a recent valuation thereof, and a re-financing amount, said data input terminal being connected to a data processing means to which is connected a data storage means,
(ii) storing in said data storage means an initial value of said property, the principal of said first mortgage, the principal of said second mortgage, first and second predetermined percentages, and the data required to calculate a current repayment amount of said second mortgage, and including rise and fall percentages,
(iii) using said data processing means to calculate a base refinancing amount being the product of said first predetermined percentage and said first mortgage principal,
(iv) using said data processing means to calculate the current repayment amount of said second mortgage based said new value of said property and said rise and fall percentages,
(v) using said data processing means to calculate an adjusting refinancing amount being the product of said second predetermined percentage and said current repayment amount,
(vi) using said data processing means to subtract said adjusting refinancing amount from said base refinancing amount to give a resultant refinancing amount, and
(v) accepting said request for refinancing only if said refinancing amount for which approval is sought is less than said resultant refinancing amount.

In accordance with a seventh aspect of the present invention there is disclosed a method of generating a digitally encoded electric signal representing the quantum of a credit for home improvements made to the mortgagor in a wholly or partially collateral-dependent mortgage, said method comprising the steps of:
(i) inputting into data processing apparatus input data comprising the principal of said mortgage, a first valuation of the home just prior to said improvements being carried out, a second valuation of said home just after said improvements have been carried out, and a final value of said home including said improvements being a sale or deemed sale thereof which concludes said mortgage,
(ii) instructing said data processing apparatus to calculate an improvement difference comprising the increase of said second valuation relative to said first valuation, and to calculate an overall difference comprising said final valuation less said principal, and
(iii) further instructing said data processing apparatus to output either one of two of said digitally encoded electric signals, a first said signal representing a quantum of zero if said overall difference is negative or zero, and a second said signal representing a quantum of said improvement difference if said overall difference is positive.

In accordance with an eighth aspect of the present invention there is disclosed a method of generating a digitally encoded electric signal representing the quantum of an adjusted principal of a wholly or partially collateral-dependent mortgage which provides that the principal be adjusted by augmenting same by a first percentage of the increase in the event of an increase in the value of the property securing the wholly or partially collateral-dependent mortgage and that the principal be adjusted by decreasing same by a second percentage of the decrease in the event of a decrease in the value of the property securing the wholly or partially collateral-dependent mortgage, said method comprising the steps of:

(i) inputting into data processing apparatus input data comprising the principal of said wholly or partially collateral-dependent mortgage, said first and second percentages, a toggle marker consisting either of a first value indicative of the adjusted principal being determined in accordance with one of a number of predetermined events, or of a second value indicative an election of early pre-payment by the mortgagor, and a final value of said property being either a sale or an approved valuation of the property, (ii) instructing said data processing apparatus to calculate a capital difference between said final value and said principal, and if said toggle marker is of said first value to calculate the adjusted principal by multiplying said capital difference by said first or said second percentage respectively, (iii) further instructing said data processing apparatus if said toggle marker is said second value to set said second percentage at zero and calculate the adjusted principal by multiplying said capital difference by said first or said re-set second percentage, and (iv) still further instructing said data processing apparatus to output a digitally encoded electric signal representing the quantum of said adjusted principal.

BRIEF DESCRIPTION OF THE DRAWINGS

A preferred embodiment of the present invention will now be described with reference to the drawings in which.

DETAILED DESCRIPTION

Figure 1:
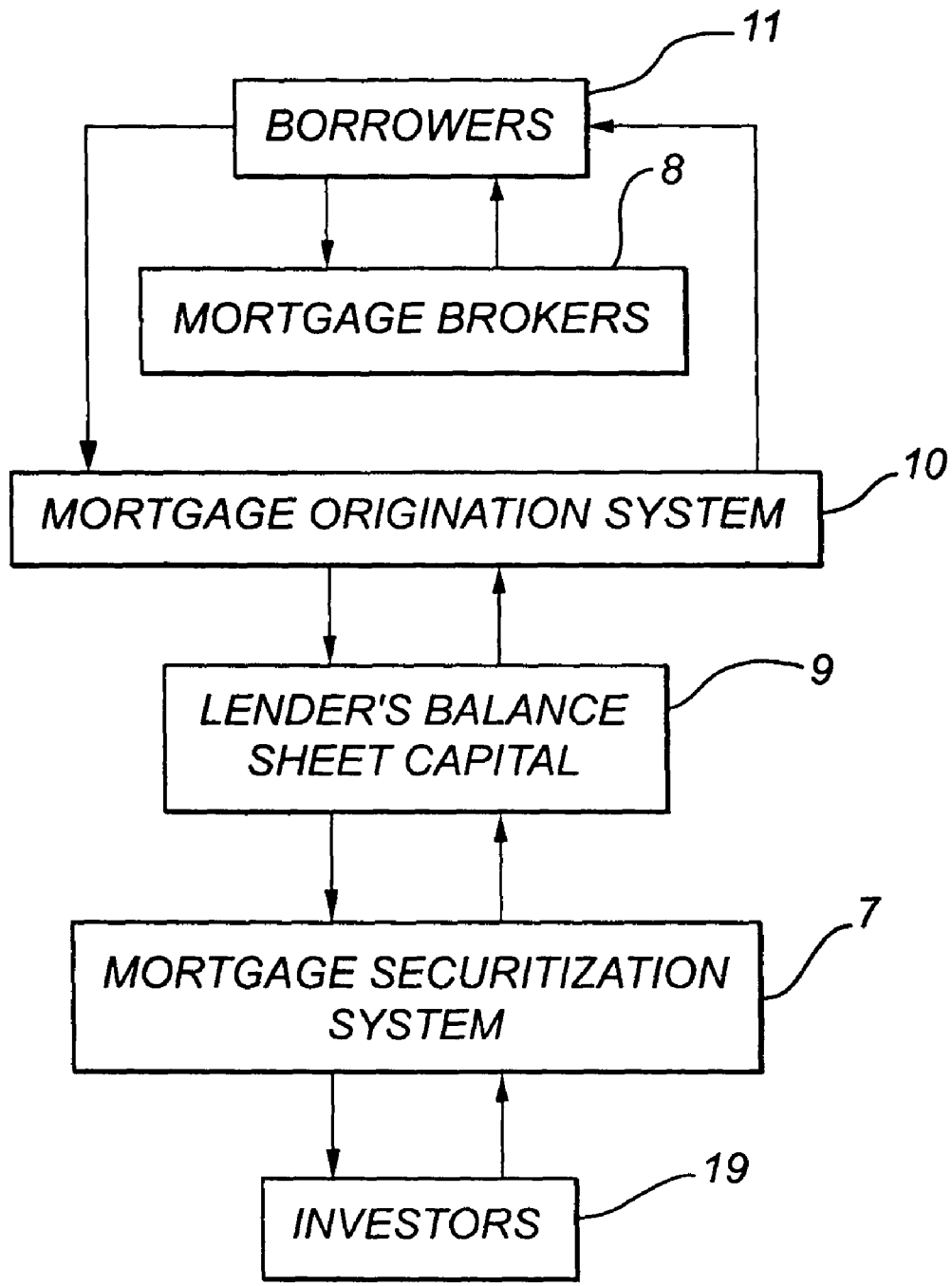
FIG. 1 is a schematic flow chart of a prior art mortgage origination and securitisation system.

The origination and securitisation of asset-backed securities such as mortgages is a common procedure in the capital markets today and FIG. 1 schematically illustrates some of the key processes involved. Traditional banks, for example, each have a mortgage origination system 10 which utilizes the bank's balance-sheet capital 9 and deals directly with borrowers 11. In recent years, borrowers 11 have also been able to deal directly with a mortgage broker 8 who in turn deals with the mortgage origination system 10 of a financial institution such as a bank.

Irrespective of with whom the borrower 11 deals, the typical result is a normal mortgage having a term and a "time-dependent" interest rate (which may be fixed or variable) and a security over the borrower's property. However, the value, and financial return or yield, realised on conventional mortgages by lenders and investors is completely independent of changes in the market value of the borrower's property, (assuming the absence of income default on the mortgage and foreclosure by the lender).

Such mortgages are able to be bundled together, for example by being assigned to a unit trust which forms part of a mortgage securitization system 7, the units of which can then be sold to investors 19. This enables the original lender's balance-sheet capital 9 to be returned to the lender and used as the lender wishes, but most typically to be recycled by the lender in the form of additional mortgages.

Such conventional mortgages are a form of time-dependent interest-bearing finance and earn returns that are determined by lender-stipulated interest rates, which may be fixed or floating. As such, the cash-flows supplied by these contracts are quite different from the returns realised on the collateral against which the mortgages have been secured (i.e., the underlying real estate assets). Accordingly, current mortgage origination systems are more-or-less indifferent to the specific characteristics of the collateral assets against which they lend. That is, contemporary lenders do not distribute their housing finance in order to maximise the returns realised on the properties over which their mortgages are held, given the independence between the interest rate on their mortgage contracts and price changes on the underlying properties. Stated differently, contemporary lenders can in no way be described as "investors" in the underlying assets that serve as collateral for the purposes of the financing contracts that they enter into with borrowers. Consequently, with the exception of situations such as events of default and foreclosure, contemporary lenders do not have any ongoing exposures to changes in the capital values of collateral assets such as residential real estate.

Another important characteristic of the contemporary housing finance market is that the interest rates on any standard pool of securitised mortgages tend to be essentially homogenous. It is certainly true that the specific types of properties underlying any such pool of mortgages, and indeed the performance of those properties, has no bearing on the interest rate levied by lenders when either issuing the finance or throughout the term of that finance. For example, if the Commonwealth Bank of Australia were to distribute, say, $250 million worth of standard variable home loans during any given month, these loans will usually carry the same interest rate. In this context, the Commonwealth Bank of Australia is more-or-less indifferent to the geographic regions and dwelling types against which the mortgages are issued, subject to considerations associated with default risk and collateral loss. The key issues that concern the lender are those that impact on the borrower's ability to service the interest and principal repayments on their loan over time: i.e., their past earnings history, future earnings prospects, credit worthiness, etc. The Commonwealth Bank of Australia may subsequently choose to securitise these mortgages and sell them to investors around the world, who, given the homogenous nature of the instruments, will be indifferent to the fact that they have been originated against many different types of properties (indeed, no two properties in the pool will be the same) located in different geographies. This is the case in countries such as Australia, the UK and the US, where all securitised loans must be "mortgage insured". The existence of mortgage insurance protects investors from the risks associated with income default by the underlying borrowers and the resultant prospect of collateral loss (i.e. the latter risks are in effect "sold" on to the mortgage insurer).

Given the housing affordability crises in many developed countries, which exist in spite of the current low interest rate environments, there is an undeniable need for more sophisticated forms of finance in which the consumers' cost of capital depends not exclusively on the traditional time-dependent interest rate, but rather relies on (possibly non-exclusively) both positive and negative changes to the value of the underlying collateral assets (i.e. residential real estate) without necessarily invoking laws relating to co-ownership, joint-tenancy, partnership, or joint-venture by which the lending institution would otherwise have been judged to have acquired a direct equity interest in the borrower's home. There is an equally strong need for the development of the fundamental technologies and specific financial methodologies that would enable such financing instruments to be widely distributed and underwritten on a perpetual basis by third-parties.

One complementary goal of the innovations described herein is to enable the concurrent emergence of liquid capital markets that supply third-party investors with access to the return profiles of the abovementioned securitised state- or collateral-dependent (where the latter two terms will hereafter be used interchangeably) financing contracts, the performance of which is tied to movements in the (potentially both capital and income) value of the underlying collateral assets. To highlight one specific example, it is anticipated that the detailed business technologies, methods, and systems described below will allow households around the world to dramatically cut the upfront costs of home ownership, or to release capital that is currently tied up in their existing dwellings, by drawing on state- or collateral-dependent real estate equity (and related variations thereof, including interest or rental yield bearing combinations), where the rate of return realised by the lending entity is related to the performance of the household's property. These creditors may then choose to package such "equity finance" instruments into a tradeable form, sell them on to secondary market investors, and, by doing so, potentially permit the development of even more sophisticated financial claims (e.g. residential real estate derivatives).

For the avoidance of doubt, the term "state- or collateral-dependent" as used herein in relation to financing contracts (whether they are legally classified as debt, equity or hybrid arrangements), means that the lender's cost of capital is dependent on the current value of the underlying collateral asset such as a residential property, and future positive or negative changes in the market value of that asset (including both capital and yield income components). The advent of such state-dependent financing arrangements, which do not, presently exist in any universal form in industries such as the mortgage market, relies very much on the development of the asset-selection, processing, servicing, securitization and portfolio management systems, methods and technologies that can bind together the consumer and investor markets sides of the financing equation by supplying both constituencies with tractable value propositions.

In order to exemplify such financing arrangements, consider a young, cash-constrained couple that wishes to start a family and move into a $200,000 home. Assume that they have scant savings and must take out a 90% loan, which implies that they enter into a $180,000 standard interest-bearing mortgage. If interest rates are at, say, 7%, as is the case in many developed countries currently, this young couple will need to pay approximately $1,500 per month for the 30 year term of their loan, if they aspire to ever fully pay off their debt. With the escalating price of residential real estate in many OECD nations over the last decade, a significant number of low-income aspirants do not have sufficient disposable income to pay for a deposit, or adequate ongoing earnings to service the interest and principal payments on a loan. They are, as a result, forced to delay their first home purchase and consign themselves to the spectre of rental accommodation for the foreseeable future (to say nothing of having to defer the prospect of starting a family as well).

Consider an alternative scenario in which this couple draws on both a standard home loan and a collateral-dependent form of equity finance (i.e. a loan that carries no interest rate, but rather recompenses the lender via exposures to the underlying property's gains and losses). In particular, suppose that a financial institution lends them, say, 20% (i.e. $40,000 of $200,000) of the appraised value of their property upfront in return for rights to 40% of any potential price rises and 20% of any price declines in the market value of the property. As a consequence, this couple now only needs to fund $160,000 (i.e. $200,000 less $40,000). If, once again, a 90% loan-to-value ratio is assumed, the size of the home loan falls by 20% from $180,000 to $144,000. Assuming a 7% interest rate, the ongoing interest and principal payments are cut from around $1,500 a month to $1,200 a month; and hence the required deposit drops from $20,000 to $16,000. Since the loan-to-value ratio on the couple's interest-bearing home loan has fallen from 90% to 72%, it is also likely that the need for mortgage insurance had been avoided. In addition, there may be a rise in the couple's disposable income once they move into their abode (as a result of their diminished debt servicing obligations), a reduction in their risk of default, and a material increase in their liquid wealth at retirement since they no longer have to dedicate most of their savings to the otherwise inaccessible dwelling asset. And so, whereas this family might once have been priced out of the home ownership market, buying a property has now become a much more realistic ambition.

As discussed above, it is currently impossible for institutional investors to access owner-occupied housing's risk-return profile in a well-diversified fashion or to trade home equity. This is especially unfortunate considering that residential real estate equity has performed extremely well in comparison to stocks, bonds and cash over the years, to say nothing of its attractive "correlation" characteristics (i.e. residential real estate moves in a very different direction to the other investment categories, thereby opening the door to valuable diversification gains). Finally, residential property is the largest asset-class on earth—in fact, some multiples the size of both equities and fixed income—and was recently valued by The Economist magazine at in excess of US$50 trillion in developed countries alone.

The closest substitutes currently available to portfolio investors are Real Estate Investment Trusts ("REITS"). But almost all REITs are based on lumpy commercial real estate, and those with residential exposures are constrained to rental properties in idiosyncratic apartment groupings. Both the commercial and rental property markets are characterised by unique risk-return dynamics, and represent but a small proportion of the biggest, and in many respects, most attractive, investment category of them all: owner occupied residential housing.

The financial community should therefore view securitised pools of the aforementioned equity finance mortgages in a very positive light. Institutions are constantly searching for new categories of investments, particularly those with return profiles that differ from stocks and bonds. In the past, this led to institutions allocating significant capital to private equity vehicles and hedge funds, despite the potentially high risks that these strategies involve. The owner occupied residential real estate market is a good place to look for an immense new set of asset returns and some extremely appealing diversification opportunities. Yet in order to transform owner occupied residential real estate into a genuine investment class, one must first create the underlying financial arrangements that would form the basis of the securitised investment pools. In turn, these arrangements need to be satisfactory from both the consumer and investor perspectives. This is no trivial task, and the absence of any such market today is testament to the difficulties that lie in wait. Once the "optimal contracting" problem is solved (i.e. whereby a durable long-term contractual arrangement can be forged between, say, the debtor and creditor), one must still design the practical technologies and commercial processes that will successfully govern the identification, selection, administration, processing, and servicing of these arrangements, while at the same time developing the securitization and ongoing portfolio management procedures that will enable the highly idiosyncratic individual assets to be converted into a marketable investment form.

Overview

An integrated set of instruments, technologies and business systems are disclosed that collectively seek to achieve the following two key objectives. Firstly to provide consumers with a state-dependent financing instrument (i.e. where the cost of capital is tied to positive and negative movements in the value of the underlying collateral asset, independent of any traditional, time-dependent interest rate that may or may not also form part of the arrangement) in which they can share with external third-parties some of the risks and returns associated with their otherwise indivisible investment in a typically illiquid and potentially very risky asset (e.g. the owner-occupied home). Secondly to provide external third-party investors with access to a diversified pool of assets that will enable them to obtain cost-effective exposures to the underlying investment class, an outcome that is presently exceedingly difficult for such third-parties to secure. As previously discussed, the societal benefits borne from engineering these new markets, and bringing together the independent consumer and investor constituencies in order to simultaneously satisfy the wants and needs of both, are many and compelling.

One prospective mechanism for developing such opportunities would be through the advent of a new form of housing finance described herein as the Equity Finance Mortgage ("EFM"), and which is materially different from that proposed in the abovementioned Report of the Prime Minister's Home Ownership Task Force. The EFM instrument is a "hybrid" financial arrangement in the sense that it is legally classified as debt (since it is based on a standard mortgage contract), while also providing economic payoffs akin to an equity investment in residential real estate—i.e. where the return on the mortgage is determined by formulae dependent upon the economic performance (e.g. capital appreciation and/or depreciation) of the housing asset against which it was lent. The aspects of the invention described hereafter detail previously undisclosed methods, instruments, technologies and business systems that relate both to the EFM contract, and the myriad of processes and systems required to enable the practical operationalisation of such contracts. These methods, instruments, technologies and business systems are, however, equally applicable to any other form of financial arrangement that has a "collateral-dependent" payoff, and the detailed description below relating to EFMs is not intended to be limiting.

Figure 2:
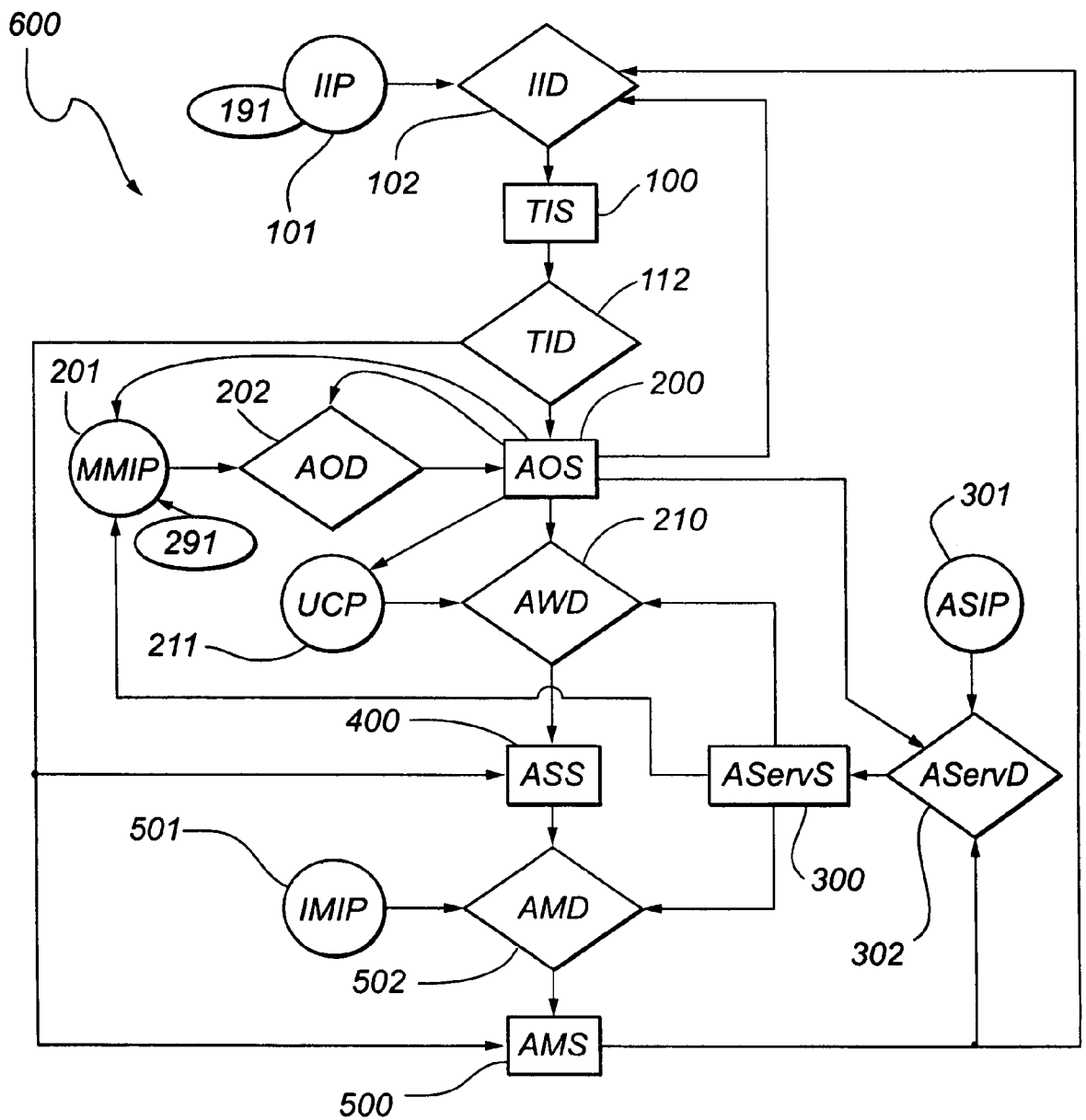
FIG. 2 is a schematic flow chart of the asset targeting, selection, servicing, securitisation and portfolio management system of the preferred embodiment.

The business systems, technologies and processes described in FIG. 2 take the form of five modular systems, each controlled by an integrated computerised system (represented in FIG. 2 as a square), many components of which can function in a "real-time" automated fashion, that together form what is known as the "Asset Targeting, Acquisition, Servicing, Securitisation and Portfolio Management System", hereafter the "Overall System" 600. This in turn is typically overseen by a human operator known as the System Manager ("SM").

As discussed, the chief objective of the Overall System 600 is to enable the successful distribution of EFMs (used here as an example of a collateral-dependent financing arrangement) to consumers by way of drawing on financing or "underwriting" capital supplied by third-party investors, and the subsequent packaging of those individual EFMs into large pools or portfolios, the characteristics of which are aligned with the preferences of third-party investors who may or may not have supplied the original financing capital. In relation to the latter point, the uncertainty as to whether the third-party investors are the same entities that provided the original financing capital is attributable to the fact that that the Overall System 600 can accommodate either a one- or two-stage capital provision process. In the one-stage example, capital can be raised from investors upfront and used to underwrite the distribution of the EFMs to consumers. As the capital is exhausted, the EFMs are placed into a portfolio held by the same entities that supplied that capital in the first place. These entities are, therefore, also the end-user investors. In the two-stage alternative, the Overall System 600 incorporates "intermediating" financiers or "warehousers" that provide short-term underwriting capital for the purposes of enabling the distribution of the EFMs. However, once all this capital has been used up, the Overall System 600 packages the EFMs into a pool that is then sold to a class of new investors. After the interests (e.g. shares or units) in this packaged portfolio of EFMs have been sold to third-parties, the original provider(s) of the financing capital (i.e. the warehousers) are repaid, and recompensed for supplying their intermediation service.

It can be seen therefore that there are a number of different ways in which the relationship between the consumer and end-user investors can be structured. This is potentially a point of confusion, since one has to account for the existence of a multiplicity of parties on the financing side of the relationship: the distributor (which could be a mortgage bank); the lender of record (i.e. the "mortgagee"); the providers of the financing capital (e.g. the underwriters), and the end-user investors. In a practical sense, it is quite likely that the EFM distributor, which may be a large bank, will never hold the EFMs on its balance sheet nor act as the lender of record (notwithstanding that it is entirely plausible that EFM distributors do fulfil such functions for a period of time). The present application anticipates that the more likely scenario is one where the lender of record is a custodian company or financial services administration entity that holds the EFMs on behalf of either the providers of the financing capital (i.e. the short-term underwriters) or the end-user investors (in the event that there are no underwriters). For simplicity's sake, the terms "lending institution", "financing entity", "synthetic equity provider", "investor", "mortgagee" and "creditor" will therefore be used interchangeably in recognition of the fact that these parties may be one and the same, or separate entities fulfilling a collective objective.

The five independent yet fully integrated systems of the Overall System 600 and their related database interactions, are summarised as follows:

1. The "Target Investment System" 100

The initial role of the Overall System 600 is to continuously collect, from its Investment Information Providers ("IPs") 101, the many and varied preferences of its end-user investors (i.e. those that are going to be the ultimate holders of the EFM portfolios), such as their desired portfolio-level risk, return and correlation outcomes, and the types (e.g. fully detached properties or apartments) and locations (e.g. Sydney or Melbourne) of the underlying collateral assets that these investors would like to see in the final EFM portfolio. The IIPs 101 also furnish other information of relevance to the future performance of the EFM portfolio, including past, present and forecast data of a macroeconomic, microeconomic, or real estate related nature. This information, which is continuously updated through time, is inputted into a central electronic database (the "Investment Information Database", or "IID" 102). The IID 102 is maintained not just for the need to record investor preferences, but for the dominant purpose of providing the Target Investment System ("TIS") 100 with the inputs necessary to determine the "idealised" (i.e. target) portfolio characteristics of the actual originated EFM portfolios (e.g. by assigning portfolio weights to various geographies, property-types and consumer characteristics). Using an electronic connection, the TIS 100 extracts the information it requires from the IID 102 to dynamically estimate (via a series of TIS 100 embedded algorithms) the desired portfolio elements and overall attributes of the target EFM pool. These are in turn continuously updated as new information is inputted into the IID 102 over time. The TIS' 100 outputs are then transmitted by electronic feeds to the Target Investment Database ("TID") 112, which is connected via a real-time electronic interface to the Asset Origination System ("AOS") 200. As explained hereafter, the AOS 200 utilises its suite of automated decision-rules to compare the investment characteristics of EFM applications with the idealised portfolio characteristics of the TID 112 in order to process those EFM applications in real time and ultimately generate a final EFM pool that matches the TID 112 attributes to the maximum extent possible, thereby satisfying the preferences of its end-user investors. One final responsibility of the TIS 100 is to respond to the Investment Mandates ("IM") of the Asset Management System ("AMS") 500, and through data collected from the IID 102 output dynamic updates to the TID 112 that provide the AMS 500 with its target portfolio characteristics (once again, via electronic connections between the AMS 500 and TID 112).This enables the AMS 500 to process its own decision-rules and undertake the actions required to ensure that the investment pools' actual performance converge as closely as possible to the preferences of the various investors in those pools.

2. The "Asset Origination System" 200

Utilising its real-time electronic connections with the TID 112, the Asset Origination Database ("AOD" 202), and with the Asset Warehouse Database ("AWD" 210), the AOS 200 automatically manages the issuance of EFMs to end-user consumers via its distribution agents (Mortgage Market Information Providers, or "MMIPs" 201) with reference to various static and dynamic feed-back and feed-forward decision-rules. Such rules ensure that the actual characteristics of the EFMs that it sources from consumers, and, in particular, the attributes of both the underlying collateral assets (in this case, residential properties) and the consumers themselves, match within acceptable error bands the TID's 112 idealised portfolio preferences, thereby ultimately giving rise to a realised pool of EFMs that will be acceptable to third-party investors. This involves establishing complex asset-selection rules, based on a wide range of geographic, consumer and property related portfolio preferences, which determine—in real-time and on a substantially automated basis—whether EFM applicants (i.e. consumers) are accepted or rejected by the MMIPs 201. Over and above such use of static and dynamic feed-back and feed-forward decision-rules, in conjunction with its real-time electronic interfaces with the TID 112, AOD 202, and AWD 210, the AOS 200 also encompasses a dynamic MMIP 201 remuneration system that operates to further improve the probability of the AOS 200 achieving its portfolio construction objectives. In particular, the AOS 200 calibrates dynamic MMIP 201 remuneration strategies that provide the distributors of EFMs with the strongest possible motivation to issue the contracts in line with the end-user preferences stored in the TID 112, while simultaneously refining the MMIPs' 201 financial incentives in response to their observed performance over time.

As a final task, the AOS 200 interacts with the Underwriting Capital Providers ("UCPs" 211), and, once an EFM application has progressed through the AOS' 200 decision-rules and been formally approved, administers the transfer of capital from the UCPs 211 to each applicant (via the MMIPs 201) that has successfully sought finance. The security that is provided by the applicant in exchange for the finance is the underlying financing arrangement (in this case, an EFM), which is held by the UCPs 211 or an administration intermediary on behalf of the UCPs 211. The characteristics of each EFM are stored in the AWD 210 for the duration of the warehouse period (e.g. until such a time as all the required EFMs are sourced, and the final portfolio is closed, or, in the event of a two-stage capital provision process, the portfolio is securitised or otherwise sold to third-party investors that are independent of the UCPs 211).

The AOD 202 provides the AOS 200 with a wide range of inputted application data from the MMIPs 201, who are typically (although, under a Internet-enabled direct distribution model, not always) responsible for interfacing with applicants. The EFM application information sourced by the MMIPs 201 is inputted into the AOD 202 either by way of a real-time electronic Internet-based interface, or manually upon receipt of a fax-based application form, and covers data relating to the characteristics of the applicant (e.g. age, current residential address, occupation, income, marital status, first mortgagee, credit history, prior ownership experience etc), the current or sought-after dwelling's attributes (e.g. location, price, purchase method (auction or private-sale), land size, land-to-dwelling ratio, number of bedrooms, bathrooms, etc), and MMIP 201 specific variables (e.g. distributor type (mortgage broker or financial planner), corporate membership, geographic location, current remuneration structure, EFM distribution history, etc). The AOS 200 has a real-time electronic connection with the AOD 202, and upon receiving a transmission of EFM application data from the AOD 202, subjects this information to a series of static and dynamic feed-back and feed-forward decision-rules. The dynamic decision-rules involve the AOS 200 making real-time comparisons between the application data and the portfolio preferences stored in the TID 112. If the application data successfully progresses through all of the AOS' 200 decision-rules, the AOS 200 approves the application and determines, subject to a series of algorithms, the application's pricing and specific terms. This information is then relayed back through the AOD 202 to the MMIP 201 that sourced the application in the first place. Once the transaction is settled, the relevant data pertaining to the applicant, property type, MMIP 201 agent, and the contract terms are transmitted from the AOD 202 though the AOS 200 to the AWD 210, which holds all information relating to formally approved EFM applications. The AWD 210 also captures additional data provided by the UCPs 211, such as the amount of underwriting capital, and the share of that capital that has been drawn-down during the EFM distribution period. If, on the other hand, the EFM application does not successfully pass through the AOS' 200 decision-rules, a rejection or referral signal is sent by the AOS 200 through the AOD 202 to the MMIP 201. To continuously refine its decision-rules, the AOS 200 stores all rejected and referred application data in the AOD 202.

3. The "Asset Securitisation System" 400

At a time determined either automatically via pre-specified parameters (e.g. once a certain value of EFMs have been sourced, or a particular period of time has elapsed), or at the SM's discretion, the Asset Securitisation System ("ASS") 400 uses its real-time electronic interfaces with the TID 112 and the AWD 20 to compare the characteristics of the EFMs that have been actually sourced with the updated investor preferences contained in the TID 112 (recall that these are being continuously refined over time as new information is inputted into the IID 102). The ASS 400 then processes a suite of static and dynamic feed-back and feed-forward decision rules to determine what actions if any are required in order to optimise the structure of the investment pool comprising the originated EFMs in a manner that most closely matches the preferences of the end-user investors (as stored in the TID 112). In the case of a simple one-stage capital provision process (whereby the original suppliers of the underwriting capital are the same investors who intend to hold onto the EFM assets over the long-term), the ASS 400 simply calibrates the characteristics of the existing investment pool in which the EFM assets have been held for the duration of the origination process. The ASS' 400 more sophisticated structuring and optimisation capabilities are better leveraged when it transfers the originated EFM assets from a warehouse vehicle controlled by the UCPs 211 (who in this scenario would have supplied the AOS 200 with underwriting capital on a relatively short-term, intermediation basis) into potentially a multiplicity of investment portfolios that are to be marketed to third-party investors. Hereafter the procedure by which the ASS 400 evaluates the originated pool of EFMs and determines the final investment pool's characteristics will, for ease of description, be referred as the "securitisation" process.

Once the securitisation process has been completed, the ASS 400 transfers all of the relevant EFM contract data from the AWD 210 and the Asset Servicing Database ("AServD") 302 onto the Asset Management Database ("AMD") 502, which concurrently collects information from the Investment Market Information Providers 501, or "IMIPs" (e.g. primary and secondary capital market participants, such as stock brokers, investment analysts, and other capital market information providers). This latter suite of information will include, but is not limited to, the final pool registry, ongoing registry data, and secondary-market trading information, such as the pool's price, volume, volatility and yield. Concurrently, the ASS 400 determines the remuneration of the UCPs 211—in the event that they are holding the EFMs assets on a short-term intermediation basis—via proceeds realised from the securitisation event.

4. The "Asset Servicing System" 300

There may be a significant period of time between the date on which an EFM is first distributed to a consumer and the date on which it is finally securitised (e.g. over 12 months). Throughout this period, and for the duration of the EFM contract's life, the Asset Servicing System ("AServS") 300 is responsible for all of the EFM contract's administration requirements, which are outsourced to Asset Servicing Information Providers ("ASIPs") 301. These administrative requirements involve, amongst other things, variations to the contract's terms, events of default, prepayments, renovations to the properties, repayments, refinancings of related contracts (e.g. a first, interest-bearing mortgage) and, subsequent to discharge, the processing of cash flows through to end-user investors. Any data relating to the EFM contract servicing events is electronically inputted by the ASIP's 301 into the Asset Servicing Database ("AServD") 302, which then relays the details onto the AServS 300 via its own electronic interface. In turn, the AServS 300 electronically interacts with both the AWD 210 during the warehouse period, and the AMD 502 once the EFMs have been securitised in order to manage the ongoing EFM servicing requirements of both securitised and non-securitised EFMs. The AServS 300 also interfaces indirectly with the AOS 200 via the AServD 302 in order assist with the AOS' 200 management of the MMIPs' 201 ongoing remuneration during the life of the EFM loans.

5. The "Asset Management System" 500

Post securitisation, the Asset Management System ("AMS") 500 employs a suite of static and dynamic feed-back and feed-forward decision-rules to monitor the risk and return characteristics of the listed and unlisted securitised EFM pools (via its electronic connection with the AMD 502) in order to ensure that their behaviour and performance is consistent with the expectations of investors in those pools, as stipulated by data and information collected electronically from both the IID 102 and the TID 112.

After extracting data from the AMD 502, IID 102 and the TID 112 and processing this through its decision-rules, the AMS 500 determines, amongst other things, what changes if any need to be made to the terms and conditions of the EFM contracts underlying the pool (e.g. in order to stimulate certain consumer actions). In the event that the AMS 500 concludes (based on its rules) that the terms of the pools' underlying contracts should be altered, it will electronically signal these changes through the AServD to the AServS 300, which gives effect to the requested changes and informs the AMD 502 of their consequences. By way of illustration, if households in a certain location, such as North Sydney, are holding onto their EFMs for a significantly longer period of time than was original forecast when marketing the pool to investors, such that the diminished magnitude of the pool's cash-flows serves to the detriment of those investors, the AMS 500 may instruct the AServS 300 to reduce the cost of EFMs in that area for a limited period of time in order to stimulate a higher rate of repayment. Alternatively, in the case of an investment pool that is open-ended with new tranches of EFMs continuously fed into it over time, the AMS 500 will determine what modifications are required to any additional tranches of assets in order to optimise the pools' future performance. If changes are deemed necessary, the AMS 500 will electronically signal these changes to the TIS 100 via the IID 102 and thereby influence the actions undertaken by the AOS 200 and, ultimately, the composition of EFMs that are sourced by the MMIPs.

FIG. 2 provides an overview of the end-to-end applicant-to-investor composite technological system and processes that lies at the heart of the Overall System 600. Detailed comments regarding the individual systems 100-500 are relegated to the next section of the application. Note that while the systems (and their corresponding processes) are related, each individual system serves a distinct commercial objective and thus can be independently deployed. That is to say, the technology disclosed herein can be developed sequentially with the modular components of the Overall System 600 operating as independent technological architectures.

The data processing capabilities and technological structure of the Overall System 600 can be distinguished from prior art mortgage origination and securitisation systems in several different ways.

First, the Overall System 600 electronically integrates on an end-to-end basis the otherwise independent mortgage identification, screening, selection, processing, securitisation, servicing and ongoing portfolio management system requirements, which in the prior art are divided into independent utilities that do not typically interact with one another.

Second, the Overall System 600 has been conceived to enable the identification, screening, selection, securitisation and servicing of a class of financing arrangements (using real-time automated decision-rules) that supply risk and return payoffs that are fundamentally different from that which is associated with prior art mortgage instruments. In particular, prior art forms of interest-bearing finance (e.g. home loans) earn returns that are determined by time-dependent interest rates, which are fixed or floating. As such, the cash-flows supplied by these contracts are quite different from the returns realised on the collateral against which they have been secured (i.e. residential real estate). By way of contrast, an EFM is a contract that provides compensation to the financier through rights to future changes in the value of the underlying asset that has been used as collateral. The cost of capital to the consumer is not therefore exclusively time-dependent, as in the case of the prior art mortgage market, but rather relies on the future positive and negative price performance of the property in question. That is to say, the EFM's cost of capital is "state- or collateral-dependent". Accordingly, while prior art mortgage origination and securitisation systems are almost entirely indifferent to the specific characteristics of the housing assets against which they lend (especially given the existence of mortgage insurance), this is the primary area of interest for the Overall System 600 (since the attributes of the collateral asset itself have a first-order influence on the performance of the financing arrangements).

Third, the individual rates of return attributable to the state-dependent financing arrangements that comprise a portfolio of EFMs are inherently heterogenous, whereas the interest rates attributable to the individual mortgages that make up a standard mortgage pool are homogenous. As discussed previously, the Commonwealth Bank of Australia may in any given month distribute, say, $250 million worth of floating-rate mortgages, all of which will carry exactly the same interest rate. In this context, the Commonwealth Bank of Australia will be more-or-less ambivalent as to the geographic regions and dwelling types against which the mortgages are issued. It may then choose to securitise these mortgages and sell them to investors all around the world, who, given the uniform nature of the instruments, will be indifferent to the fact that every property that serves as security will be quite unique in terms of both its geographic location and its physical characteristics. In comparison, $250 million worth of state-dependent EFMs gives rise to a pool of highly idiosyncratic assets, each of which will have very different expected rates of return. Furthermore, the geographic regions and dwelling types against which the EFMs are issued will have a profound influence on the portfolio's expected performance (to say nothing of the fact that they represent claims over Australian residential real estate, which may perform in a very different fashion to other property markets overseas, and hence be of limited interest to offshore investors). Consequently there is a need to identify, screen, select, securitise, service and portfolio manage EFM-like assets in a much more sophisticated fashion to that which takes place in the prior art mortgage market. This need is met utilising technologies which dynamically regulate the asset-selection process through time. By way of example, while the Commonwealth Bank of Australia might regard it as acceptable to issue $250 million worth of mortgages in Western Sydney, it is unlikely that investors in a $250 million EFM pool would regard having all their assets located in such a concentrated geographic area as being acceptable.

Fourth (and as a result of point three), the Overall System 600 employs an extensive suite of static and dynamic feed-back and feed-forward decision-rules to control the distribution of EFMs through time subject to the target portfolio preferences of third-party investors. The Overall System's 600 chief objective is to maximise the probability that the attributes of the approved pool of EFMs will be in line with those that desired by the end-user investors (whose wishes are represented by the use of an "idealised" or target investment portfolio). As discussed above, since the returns to the EFMs rely on the performance of a highly heterogenous collection of collateral assets (i.e. residential real estate), the process by which these assets are screened and selected is vastly more complicated than the methodologies by which traditional banks issue prior art interest-bearing mortgage contracts.

As a final point of differentiation, the Overall System 600 encompasses an integrated asset management system that employs static and dynamic feed-back and feed-forward decision-rules and process control systems to automatically modify the terms and conditions of the underlying financing arrangements, and the characteristics of future tranches of assets that are added to the pools, with the objective of minimising the observed differences between the performance of those pools and the preferences of end-user investors. This relies on integrated electronic interfaces between the asset management system, various memory banks that store information regarding the performance of the pools and the requirements of investors, and other critical control systems that manage the production of the target portfolio, the selection of the underlying assets, and the servicing of those assets through time.

Explanation of Individual Aspects

1. State-Dependent Financing Arrangements

The following is a description of one or more embodiments of the EFM In accordance with one embodiment of the EFM, creditors offer to provide consumers with finance equal to a percentage (e.g. 20%) of the total value of their collateral assets (e.g. an owner-occupied property) on a zero-interest basis in return for eventual repayment of:

(1) the principal amount lent;
(2) plus rights to a pre-determined share of any capital appreciation on the collateral asset (e.g. 40%); or
(3) less rights to a pre-determined share of any capital depreciation on the collateral asset,
where the total amount owing under the EFM is determined on the date of discharge or repayment, which will be specified in the financing documentation, and might typically occur on the sale of the asset in question or upon the election of the borrower.

For the purposes of the present explanation, the mathematical relationship between the proportional value of the financing supplied by the creditor (i.e. the principal amount lent as a fraction of the value of the collateral asset at the time the financing was extended) and the creditor's rights to a share of the collateral asset's future capital appreciation or capital depreciation (whichever eventuality is relevant as at the date of the discharge of the total amount owing under the EFM), can be expressed as the ratio X:Y:Z, where X denotes the proportional value of the financing supplied by the creditor, Y refers to creditor's rights to any future capital appreciation of the collateral asset as a proportion of the value of that collateral asset's total capital appreciation; and Z denotes the creditor's rights to any future capital depreciation of the collateral asset as a proportion of the value of that collateral asset's total capital depreciation.

Accordingly, a 1:2:1 EFM "cost of capital" would indicate that for every percentage point of finance that the creditor supplies, it would be entitled to two percentage points of all future capital appreciation and one percentage point of all future capital depreciation. Note, however, that more sophisticated representations of this general case are easily envisaged to those expert in the art, particularly representations incorporating time-varying claims to the capital appreciation, Y, or capital depreciation, Z, on the underlying collateral asset, and/or arrangements that encapsulate a time-dependent interest rate or proxy for the estimated income yield on the collateral asset (where the combined capital and income returns would represent the total economic performance of the asset in question). By way of illustration, the following EFM cost of capital alternatives can be practically deployed, although these are not in anyway representative of the complete universe of possibilities that could be engineered by those expert in the art:
  (1) a 1:1:1 EFM cost of capital;
  (2) a 1:1:0 EFM cost of capital;
  (3) a 1:1.5:0 EFM cost of capital;
  (4) a 1:2:1 EFM cost of capital;
  (5) a 1:2:2 EFM cost of capital;
  (6) a 1:2:0 EFM cost of capital;
  (7) a 1:3:1 EFM cost of capital;
  (8) a 1:3:2 EFM cost of capital;
  (9) a 1:3:3 EFM cost of capital;
  (10) a 1:3:0 EFM cost of capital; or
  (11) any one of the above in combination with a standard time-dependent interest rate or rental yield proxy.

One crucial implication of the state-dependent nature of the EFM's cost of capital is that it can give rise to contingencies whereby the cost of this form of finance to the borrower over long periods of time is either negligible, nil, or negative. For example, if the value of the borrower's collateral asset has not increased as at the date of discharge, the borrower will simply repay the original loan amount that was extended to it by the creditor on the date that the borrower entered into the EFM arrangement, with no additional interest costs. The EFM would therefore have been a free form of finance. If, to take another example, the value of the borrower's collateral asset has fallen as at the date of discharge, the creditor may assume some of these capital losses and reduce the value of the original loan amount as appropriate. This would result in an entirely unique situation, with no known precedent in the prior art, whereby the cost of the EFM finance to the borrower would be negative: that is, there would be a value transfer from the creditor to the borrower. There is not any current form of housing finance that incorporates such features, and which could give rise to frequent eventualities whereby the cost of that finance to the borrower is actually negative.

For explanatory purposes, it is henceforth assumed that all EFMs carry a 1:2:1 cost of capital. Other features of the EFM contract include, but are not limited to:
  (1) The borrower's obligation to discharge the EFM is triggered by any one of transfer or resumption of the property, the death of the owners, the n year anniversary of the loan, the exercise of novel prepayment provisions, or events of default;
  (2) The EFM can be "prepaid" (i.e. without the property being sold) at any point during the contract's potential n year life (such circumstances trigger a binary switch in the EFM whereby its cost of capital reverts to a "1:2:0" ratio rule in which the creditor need not share in any capital losses on the underlying property). As will be discussed later, this binary switch in the EFM cost of capital is an important mechanism for controlling for the negative effects of perverse "gaming" by consumers, and "adverse selection" more generally;
  (3) The consumer legally owns 100% of the equity in their collateral asset and retains similar rights and liberties to those that they possess under a standard prior art mortgage product;
  (4) The EFM is secured by a mortgage over the collateral asset, or a second mortgage where the borrower has taken out a standard interest-bearing mortgage, which can be uniquely packaged together with a "subordinated" EFM;
  (5) An improvements provision that enables the borrower to receive credit on the date of discharge of the EFM for any increase in the collateral asset's value that arises as a result of independently appraised capital improvements undertaken by the borrower during the term of the contract. As with the prepayment provision, this improvements procedure will be described more fully below; and
  (6) The specific terms and conditions of the EFM contract can be calibrated to generate investment returns that satisfy the requirements of external third-party investors in a diversified pool of such contracts.

A final key feature of the EFM contract is that the investment interests of the borrower (i.e. the future performance of the underlying collateral assets) are very closely aligned with those of the creditor and, where applicable, investors in diversified pools of these contracts. Further details of the contract contemplated by the EFM are provided below.

1.1 Consumer Value Proposition

In the housing market, demand for EFMs is expected from three primary consumer categories with varying value propositions:
  (1) First-time buyers who: (a) are not be able to afford to purchase a property, (b) want to reduce their upfront costs, or (c) want to buy a more expensive home;
  (2) Existing home owners who (a) want to refinance their current mortgage in order to reduce their ongoing mortgage repayments, or (b) want to upgrade to a more expensive home; and
  (3) The asset-rich yet income-poor elderly who want to access an equity-release mechanism other than reverse mortgages.

EFM creditors will likely impose a maximum loan-to-value ratio on the total financing that the borrower draws on (encompassing, for example, both a first interest-bearing mortgage that has been bundled together with a subordinated, or in other cases, an equal-ranking, EFM) to ensure that the borrower has a significant financial investment in the collateral asset at the time the finance is extended.

EFMs should prove to be an attractive form of housing finance for consumers. Table 1 provides a comparison of financing a property with a traditional mortgage ("Traditional Scenario 1"), and two alternative scenarios in which the consumer uses an EFM in combination with the standard form of interest-bearing finance ("Traditional+EFM Scenario 2" and "Traditional+EFM Scenario 3").

TABLE 1

Traditional Housing Finance Compared with the use of an EFM

| Traditional Scenario 1 >Traditional mortgage only | | Traditional + EFM Scenario 2 >EFM to reduce costs | | Traditional + EFM Scenario 3 >EFM to buy more valuable home | |
|---|---|---|---|---|---|
| Property Value | $500,000 | Property Value: | $500,000 | Property Value: | $625,000 |
| Prime Mortgage (90%) | $450,000 | EFM (20%): | $100,000 | EFM (20%): | $125,000 |
| Deposit: | $50,000 | Need to fund: | $400,000 | Need to fund: | $500,000 |
| LMI (about 1.5%): | $6,750 | Prime Mortgage (72%): | $360,000 | Prime Mortgage (72%): | $450,000 |
| Annual P&I (7%): | $3,000/mth | Deposit: | $40,000 | Deposit: | $50,000 |
|  |  | LMI (0%) | $0 | LMI (0%) | $0 |
|  |  | Annual P&I (7%): | $2,400/mth | Annual P&I (7%): | $3,000/mth |
| >Standard Cost | | >Save 20% plus | | >Buy 25% more valuable home | |

In EFM Scenario 2, the consumer uses an EFM to reduce the size of their prime mortgage from $450,000 to $360,000. In this scenario, the consumer should benefit in a number of ways:
(1) The size of the required deposit on the prime mortgage falls by 20% (from $50,000 to $40,000);
(2) The size of the ongoing interest and principal repayments over the n year life of their traditional mortgage falls by 20% (from $3,000 per month to $2,400 per month) as a result of the reduction in the size of the prime mortgage; and
(3) The need for lenders' mortgage insurance ("LMI") is eliminated altogether (dropping from $6,750 to $0) as the value of the prime mortgage falls to 72% of the value of the property, below the level at which LMI is otherwise required (i.e. 80%).

In EFM Scenario 3, the consumer uses an EFM to purchase a more valuable home. In this example, the household is able to purchase a home that is 25% more valuable than the home in Traditional Scenario 1 for the same upfront and ongoing monthly cash costs.

1.2 EFM Payoffs

The following examples show the simplified payoffs associated with a $100,000 EFM that has been used to finance a $500,000 property with varying prices realised at the point of sale. Table 2 highlights the gross cash flow to the creditor.

TABLE 2

Examples showing EFM Payoffs

|  | Example 1 | Example 2 | Example 3 |
|---|---|---|---|
| Purchase Price | $500,000 | $500,000 | $500,000 |
| EFM | $100,000 | $100,000 | $100,000 |
| Sale Price | $500,000 | $450,000 | $550,000 |
| Borrower Repayment | Repays $100,000 ($100,000 principal) | Repays $90,000 ($100,000 principal less 20% of $50,000) | Repays $120,000 ($100,000 principal plus 40% of $50,000) |
| Comments | Borrower saves 20% on interest & principal repayments | Borrower reduces loss on property by 20% Saves 20% on interest & principal repayments | Borrower makes a profit of $30,000 on the property Saves 20% on interest & principal repayments |
| Gross Cash-Flow to The Creditor | $100,000 | $90,000 | $120,000 |

1.3 Key EFM Terms and Conditions

In the housing market context, the majority of an EFM contract's terms and conditions can be based on a standard prior art mortgage contract. The total amount owing under an EFM is due only on the date that the mortgagor discharges the loan (e.g., by selling the property or by repaying without sale). The total amount owing is determined by either a competitive transaction value (e.g., auction or private-sale treaty) or via an independent fair market valuation undertaken by a valuer (for example, a valuer approved by the creditor). In one embodiment of the EFM, the creditor has the right to accept the transaction value or to require an independent market valuation, and relies on the independent valuer's appraisal estimate if there is a discrepancy. If the borrower does not accept the appraised value, it can require a further independent market valuation in which case the value of the property will be taken to be (at the creditor's option) either the midpoint of the two valuations, or the transaction price. The creditor can also have the option to seek further valuations. If it does so, the value of the property can be the mid-point of the closest two of all the valuations. Other variations will be apparent to those skilled in the art.

Other important features of the preferred EFM contract include:
(1) The improvements provision;
(2) The refinancing provision; and
(3) The prepayment provision.

1.3.1 The Renovation Provision

The EFM contract preferably incorporates an improvements provision to enable borrowers to be credited for renovations to the collateral asset that lead to an improvement in the value of the asset and that are made with the creditor's consent.

The borrower can seek credit for improvements to the property subject to conditions which include:
(1) There is a minimum certified expenditure on the improvement determined from time to time at the creditor's discretion (this can be a fixed sum, for example, $20,000, and be subject to price indexation from time to time);
(2) An approved independent valuer undertakes a fair market valuation of the property both as at the date the renovation commences and as at the date it is completed;
(3) The renovation is completed within a certain number of months (or longer if the creditor approves) of the date it is started;
(4) The second valuation determines the incremental value attributable to the renovation. The incremental value is calculated as the difference between the property's valuations pre and post the improvement;
(5) The incremental value attributable to the renovation is credited to the borrower at time of the discharge of the total amount owing under the EFM; and (6) At the time of discharge of the total amount owing under the EFM, credit for the renovation will only reduce the amount owing to the extent that the property's value at sale (including the value of any credited improvements) is greater than its value at the time the EFM loan amount was originally advanced (i.e. the renovation provision cannot be used to produce a situation where the lender is sharing losses under the "1:2:1" rule, or similar).

1.3.2. The Refinancing Provision

The borrower can refinance any senior or "pari-passu" mortgage that ranks ahead of, or equal with, the EFM subject to conditions which include:
(1) One of the creditor's approved independent valuers is required to undertake a fair market valuation of the property;
(2) The refinancing must be with one of the relevant creditor's approved panel of senior lenders; and
(3) The total refinancing must not exceed the greater of the total senior interest-bearing debt outstanding at refinancing or, alternatively, a percentage (for example, 85%) of the refinancing valuation less any amount owing on the EFM calculated at the time of refinancing assuming that the property was sold for that percentage of the refinancing valuation, whichever is the greater.

1.3.3. The Prepayment Provision

The borrower is able to prepay all, and in one embodiment, not part, of the amount owing under the EFM while it is still owning and occupying the property subject to conditions which include:
(1) One of the creditor's approved independent valuers is required to undertake a fair market valuation of the property as at the date of prepayment;
(2) The borrower may have to repay the entire amount owing under the EFM. It may not therefore be able to partially prepay the amount owing under the EFM, although this could be allowable under the contract; and, most importantly
(3) The creditor will not share in any capital losses in the event that the approved independent valuer determines that the value of the borrower's property at the time of discharge is less than its value on the date that the EFM loan amount was originally advanced.

The binary switch in the EFM contract's cost of capital from a 1:2:1 relation to a 1:2:0 relation in the event that the collateral asset has experienced capital depreciation as at the date of prepayment by the borrower is important to the successful operationalisation of the product. In particular, it protects the creditor against circumstances in which the borrower tries to prepay the EFM to the economic detriment of the creditor (i.e. situations where the value of the collateral asset has fallen and hence the EFM cost of capital is negative). In the absence of this binary switch, it is possible that EFM borrowers would systematically time their discharge dates to coincide with down turns in the housing market and thus periods of negative collateral asset performance. This would give rise to suboptimal creditor returns.

More specific details on the mechanics of all of the above provisions are provided in Annexure 3, which contains a sample of the full EFM contract of the preferred embodiment.

1.4 Priority Agreements

Wherever there is a mortgage that ranks ahead of the EFM, one feature of the arrangements disclosed herein is an agreement between the EFM creditor and any other independent creditors that have supplied finance to the borrower in conjunction with the EFM, which agreement regulates the respective rights of the creditors. So far as practicable, the EFM creditor will always seek to secure an agreement that will protect its rights, including by placing a cap on the priority of any senior creditor (i.e. a supplier of senior ranking interest-bearing mortgage that has been bundled together with the EFM).

2. The Target Investment System ("TIS" 100)

The Overall System's 600 modular chain of integrated technologies begins with the TIS 100. In its most fundamental embodiment, the TIS 100 is a system that uses sophisticated investment algorithms to manipulate core data that it extracts electronically from the IID 102 (where that data was originally inputted into the IID 102 on the basis of information supplied by the IIPs 101) to continuously generate the "idealised" or target investment pool characteristics that it electronically outputs to the TID 112. This electronic output will typically comprise a matrix of economic preferences in a spreadsheet-like format that describe the target portfolio's attributes to a very high degree of quantitative resolution. For example, the TIS' 100 output can quantify the precise target portfolio weights to the state-dependent financing contracts (i.e. EFMs) right down to very small geographic units such as municipalities, while at the same time stipulating the maximum and minimum acceptable EFM investment thresholds subject to, say, both the geographic unit and dwelling type, amongst other things. After receiving a transmission from the TIS 100, the TID 112 stores this data in its memory bank, which can then be electronically extracted by the AOS 200 in real-time for the purposes of processing its own decision-rules.

The raw economic and financial data that is continuously inputted into the IID 102 (e.g. listed and unlisted pool valuations or median property prices for post-codes around Australia) is collected either manually via physical meetings with IIP's 101, or gathered electronically through an integrated Internet- or other computer-based network linking the Overall System 600 with the IIPs (e.g. a Bloomberg terminal or real-time feeds from property information providers). Amongst other constituents, the IIPs can include: (i) potential investors in the EFM pools; (ii) the SM; (iii) UCPs 211; (iv) investors in existing EFM pools; and (v) direct data dissemination suppliers.

(i) Potential Investors

The nature of the information entered by potential investors into the IID 102 can require that they make preliminary choices as to the portfolio characteristics that they would prefer. For example, the IID 102 enables them to select: (1) "passive" EFM portfolio exposures that supply well-diversified holdings of real estate assets that mirror the performance of the wider property market; or (2) more "active" EFM portfolio exposures that will result in the TIS 100 generating aggressive investment targets that yield higher raw returns, albeit with commensurately higher risk. Prospective investors can also state their preferred dollar value commitment to any given EFM pool, which can have implications for the volume of assets the AOS 200 chooses to accept or reject. In this context, the IID 102 has the ability to store both indicative (i.e. non-binding) and legally binding orders in relation to the prospective investors' monetary exposure to any given EFM pool.

The provision of passive investment services is a traditionally less expensive undertaking than the cost associated with supplying more sophisticated active investment strategies, and the investors' selection in this regard will have an impact on the indicative fees quoted to them via the IID at the completion of preference inputting process. It should be emphasised that the TIS 100 has the ability to generate target EFM portfolios that are tailored specifically to individual investors such as pension plans (where these investors are able to commit sufficiently large amounts of capital to warrant such tailoring), or to simply aggregate the inputted investor preferences that have been stored in the IID 102 and compute the best possible portfolio outcome that satisfies the largest number of potential investors. The former tailored alternative is often referred to in the investment industry as a "specialised mandate" in which portfolio managers will invest their larger clients' capital on an individual, non-pooled basis such that the strategy they deploy perfectly matches with the client's bespoke requirements.

To illustrate the potential specificity of the EFM pool management options outlined above, the TIS 100 can offer a range of "passive" portfolio construction methodologies to investors via the IID 102 such as to create, by way of example:

(1) EFM investment pools that are either value- or volume-weighted by the geographic location of the underlying residential properties (e.g. state-by-state, city-by-city, or post-code-by-post-code, depending on the granularity of the geographic delineations that the TIS 100 wishes to make). In this manner, the target portfolio generated by the TIS 100 has EFM weights that reflect the value- or volume-weighted distribution (where volume can be defined by either the absolute number of properties or the transactional liquidity of those properties) of residential real estate across Australia according to the relevant geographic identifiers. For example, if, say, 40% of all residential properties were located on a value basis (i.e. the total number of dwellings multiplied by the current price of those dwellings) in Sydney, then the TIS 100 produces a target EFM weight for Sydney of 40%, subject to upper and lower bound tolerance thresholds. These tolerance thresholds are in turn paramaterised via randomised statistical simulations (e.g. using a monte carlo or similar method) undertaken by the TIS 100 to determine what variations from the target portfolio weights the EFM pool could accommodate before there was a material change in its performance;

(2) EFM investment pools that are value- or volume-weighted by both dwelling type and geography. For example, where investors want to ensure that they both have the right geographic exposures and the right mix of properties. In this case, the TIS 100 quantifies the value-weighted distribution of all dwelling types subject to their location, and hence provides two-dimensional target portfolio weights that specify both the required geographic and dwelling type capital allocations.

(3) EFM investment pools that are value- or volume-weighted by dwelling type, geographic location, and, for example, the contemporaneous consumer cohorts. This represents an even higher level of portfolio construction resolution, whereby the TIS 100 produces three-dimensional value- or volume-weighted portfolio construction targets based on the distribution of all dwelling types subject to their location, and the types of consumers that occupy those properties (e.g. first time buyers, upgraders and retirees).

The objective of the passive TIS 100 weighting systems identified above is simply to provide investors with a portfolio of EFMs that most closely approximates the characteristics of the broader residential real estate market and hence minimises the so-called "tracking error", which is a metric used in the funds management industry to quantify the divergence of a passive portfolio from its chosen asset-class benchmark. Detailed information explaining each sub-option is supplied in person, over the telephone, or via the relevant EFM pool order page on the IID 102 computer-based interface.

The indicative portfolio management fees quoted by the TIS 100 through the IID 102 for the provision of such investment services are dependent on the choices made. Upon completion of each investor's initial "portfolio request", an automated message is sent via email to the investor providing a preliminary outline of the proposed portfolio construction methodology and management fee structure.

Potential investors who wish to acquire interests in active EFM pools are required to submit more detailed information to the IID 102. These participants can choose one or more of the following services, the implementation of which is carefully managed by the TIS 100 and AOS 200 as detailed hereafter (the following list is not intended to be exhaustive):

(1) The investor 191 transmits to the TIS 100 through the IID 102 their geographic portfolio construction preferences (e.g. with higher and lower weights to certain capital cities);

(2) The investor 191 transmits to the TIS 100 through the IID 102 their dwelling type portfolio construction preferences (e.g. with higher and lower weights to types of properties, such as detached homes);

(3) The investor 191 transmits through the IID 102 their portfolio construction preferences based on a variety of other distinguishing consumer- and property-related characteristics including, but not limited to, the properties' size, the properties' land-to-dwelling ratio, the properties' number of bedrooms, the properties' sale mechanisms (e.g. auction versus private-treaty sale), the properties' number of bathrooms, the occupier's age, income, credit history or cohort (e.g. first-time buyer, existing owner, or retiree);

(4) The investor 191 transmits to the TIS 100 through the IID 102 their preference that the Overall System 600 seeks to minimise the EFM pool's portfolio risk (i.e. expected future volatility) subject to the investors' pre-specified preferred level of return;

(5) The investor 191 transmits to the TIS 100 through the IID 102 their preference that the Overall System 600 seeks to maximise the EFM pool's portfolio return subject to the investors' pre-specified preferred level of risk;

(6) The investor 191 transmits to the TIS 100 through the IID 102 information with respect to its existing portfolio allocations to, say, stocks, bonds, cash and other kinds of real estate (e.g. commercial or industrial), and requests that Overall System 600 optimises its total portfolio holdings on a so-called "mean-variance basis" by adding to their portfolio a mean-variance "efficient" exposure to EFMs (whereby the investor's acceptable EFM pool allocation can be restricted by maximum upper or lower bounds determined by their own internal investment mandate, or, in other circumstances, their allocation is unrestricted), and subject to the investor's preferred total portfolio level of risk or return (i.e. across all their asset-class holdings) along the lines of the methodologies discussed in points (4) and (5) above; or, (7) The investor 191 transmits to the TIS 100 through the IID 102 their preference that the Overall System 600 constructs the EFM portfolios in accordance with the TIS' 100 proprietary investment methodologies, the precise mechanics of which are confidential and will not be disclosed to the investor;

(8) Any combination of one or more of the above.

The objective of the active TIS 100 portfolio construction systems outlined above is to engineer EFM exposures that most closely approximate the investors' communicated preferences. Detailed information explaining each sub-option is supplied in person, over the telephone, or via the relevant EFM pool order page on the IID 102 computer-based interface.

The indicative portfolio management fees quoted by the TIS 100 through the IID 102 for the provision of such investment services are dependent on the choices made. Upon completion of each investor's initial "portfolio request", an automated message is sent via email to the investor providing a preliminary outline of the proposed portfolio construction methodology and management fee structure.

At this juncture of the process, prospective investors can also be furnished with the ability to indicate a variety of other preferences with respect to further portfolio enhancements and the ongoing management of their committed capital. These additions, the provision of which is identical in method to those outlined above, include, but are not limited to, the following:

(1) Whether the investor has either absolute or relative taxation preferences for income rather than capital gains, or vice versa (in most cases provided by simply stating the relevant effective rate of tax for each based on the investor's personal circumstances);

(2) Whether the investor, other than for taxation reasons, has a preference for returns in the form of yield (i.e. cash distributions from the EFM pool) or capital appreciation and the nature of any such preference;

(3) Whether based on points (1) and (2) above, and other potential considerations, the investor would like to have the income and capital cash-flow distributions yielded by the EFM pool "reinvested" in the same EFM pool or another Overall System 600 managed investment vehicle, or, in the event that this is not the investor's preference, filly distributed to an account of the investor's choosing; and (4) Whether or not the investor would prefer increasingly diversified exposures to EFMs through the regular introduction of new "tranches" of EFMs, thereby increasing the number of assets to which the investor has access via the pool over time.

It should be noted that investors 191 who input their preferences into the IID 102 in this manner will have a strong working knowledge of the meaning of the terms used above and the application of these terms to their investment holdings.

(ii) The System Manager ("SM")

The SM has the ability to input information into the IID on a discretionary basis. There are a number of reasons why this should happen in relation to the functions of the Overall System 600 as a whole. For instance, corrective action may need to be taken in the event that the behaviour of the EFM pools is not consistent with the preferences of investors as a consequence of some unintended circumstance that was not previously anticipated by the AMS 500, and hence not catered for by its decision-rules. The electronic communications links between the AMS 500, the IID 102 and the TID 112 in FIG. 2 provide such feedback.

(iii) The Underwriting Capital Providers (UCPs 211)

In the event that their services are required, the UCPs 211 supply short-term warehouse finds to enable the distribution of EFMs through the AOS 200 in advance of securitisation by the ASS 300 and ultimate repayment of the UCPs' 211 funds. These entities also have the ability to input their preferences into the IID 102. They can, therefore, exert a strong influence over the TIS' 100 computed targets in order to prevent the origination of EFMs (through the AOS 200) that they are not prepared to hold prior to securitisation. UCPs 211 can also submit both "positive" and "negative" preferences to the IID 102. Positive preferences include the preferred characteristics (e.g. geographies, dwelling types, consumer cohorts) associated with any underlying EFMs that they would be prepared to warehouse, while negative preferences signal to the TIS 100 EFM attributes that should not be originated through the AOS 200. Accordingly, negative preferences form an important component of the TID 112, imposing a list of characteristics that cannot flow to the AWD 210.

(iv) Current Investors

Current investors are the penultimate category of IIP's 101 that input information into the IID 102. The Overall System 600 administers these transmissions on both a discretionary and automated electronic basis via the AMS 500, which is discussed hereafter. In short, many of the outputs produced by the AMS 500 reflect the results of its automated decision-rule analysis (drawing on data supplied by the AMD 502 and the TID 112), which dynamically monitors differences between the preferences of existing investors and the actual performance of the EFM pools. On the basis of the outcomes of the AMS' 500 decision-rule analysis, it electronically feeds-back new information to the IID 102 to assist in rectifying any unintended portfolio asymmetry found to exist at a given point in time. That is, the AMS 500 provides a feed-back control loop to the IID 102, and hence the TIS 100, the TID 112, and eventually the AOS 200, to influence the asset-selection rules controlled by the AOS 200 (also discussed hereafter) such that the preferences of investors and the performance of the EFM pool are more closely aligned.

(v) Direct Data Dissemination Suppliers

The final class of IIP's 101 that input information into the IID 102 are the direct data dissemination providers. These entities have electronic connections into the IID 102 that transmit regular batch or real-time informational updates on core data that is of importance to the TIS' 100 portfolio generation procedures. These entities include, but are not limited to, financial market information providers, such as Bloomberg or Reuters, government statistical agencies, credit bureaus and mortgage insurers, and property market information suppliers.

1.1 Indicative TIS 100 Portfolio Generation Procedures

As discussed above, the TIS 100 is responsible for electronically computing the target or idealised EFM portfolios that are outputted to the TID 112 and constitute an important input into the AOS' 200 decision-making process when it seeks to source EFM assets. The TIS 100 has the capability to generate multiple target portfolios on the basis of information it electronically extracts from the IID 102. These target portfolios relate to both new EFM pools that the need to be constructed to satisfy the preferences of new classes of investors, in addition to target portfolios that the TIS 100 produces for existing EFM pools that are being managed by the AMS 500, and which will influence the characteristics of new tranches of EFMs that are being sourced by the AOS 200 in order to be introduced into those existing EFM pools. In light of the above, the inputs into the TIS 100 and the outputs it produces will depend upon the nature of the target portfolio.

After the TIS 100 electronically extracts the required data from the IID 102, it undertakes a number of key steps continuously through time in order to ensure that the multiple target portfolios contained within the TID 112 are up-to-date.

A non limiting example of the architecture of these steps is set out below.

Indicative Portfolio Construction Step 1:

The TIS 100 aggregates all contemporaneous investment preferences stored in the IID 102. These will include inputted active and passive EFM portfolio requirements in addition to the so-called "specialist" investment mandates that reflect the portfolio preferences of specific investors.

Indicative Target Portfolio Construction Step 2:

On the basis of the aggregations outlined in Step 1, the TIS 100 quantitatively computes the multiple EFM target portfolios (drawing on additional core economic, financial, demographic and other required data that it electronically extracts from the IID 102) applying the various portfolio optimisation methodologies outlined below such that the target portfolios maximise the "utility" or economic satisfaction of the various classes of investors that have communicated their preferences to the IID 102.

Indicative Target Portfolio Construction Step 3:

Having computed the target portfolios' characteristics, the TIS 100 undertakes sophisticated statistical simulations (using, for example, monte-carlo like methods) of the impact of a wide range of contrived and randomised deviations from these target estimates and determines the influence of such on the portfolios' expected performance. After completing these simulations, the TIS 100 determines the maximum and minimum acceptable portfolio tolerance thresholds to a series of AOS 200 controlled attributes (e.g. the pools' exposures to different geographic regions, dwelling types, and consumer characteristics). An extract from an example of the computer programming code used to conduct such portfolio simulations is contained in Annexure 1.

Indicative Target Portfolio Construction Step 4:

The TIS 100 electronically outputs to the TID 112 the specific characteristics of the target EFM pools and the acceptable tolerance thresholds in the form of very detailed matrices that quantify to a high degree of resolution the preferred attributes of the EFM pools. An example of TIS 100 target portfolio output is contained in Annexure 2.

The TIS 100 can iterate through Steps 1 and 4 on a very rapid basis, and thereby provide intra-day updates to the TID 112, if required.

As discussed above, the TIS 100 utilises many sophisticated algorithms (e.g. non-linear, reduced gradient optimisations, monte-carlo and bootstrap simulations, neural networks and other econometric techniques), in order to compute the target EFM portfolio characteristics that most accurately approximate the preferences of investors. In the next section, a number of representative specific portfolio construction methodologies are disclosed. These are employed by the TIS 100 to compute the target portfolio outputs that it transmits to the TID 112 based on inputs supplied by the IID 102

The TIS' 100 one-, two-, and three-dimensional value- and volume-weighted passive portfolio construction processes discussed previously typically rely on estimates of the "price" of the assets that comprise the portfolios. However, given that the collateral assets underlying the EFM arrangements are usually very illiquid (i.e. they are individually bought and sold on an infrequent basis), a dependable proxy for their price at any point in time can be very difficult to obtain. When constructing passive portfolios the TIS 100 therefore harnesses a number of different proxies for the price of the individual assets in any given jurisdiction (referred to hereafter as a Statistical Local Area or "SLA"). Amongst other metrics, these measures include, but are not limited to:

(1) The asset's last quarter median price;
(2) The asset's last four quarter average median price; and,
(3) The asset's last four quarter average volume-weighted median price.

The TIS 100 can construct passive value-weighted EFM portfolio estimates using the following formulae, which correspond chronologically to the three asset-price proxies disclosed above:

$$w_{SLA_i} = \frac{\text{Median Price}_{t,SLA_i} \times \text{Total Dwellings}_{2001,SLA_i}}{\sum_{SLA_i}^{N} \left( \text{Median Price}_{t,SLA_i} \times \text{Total Dwellings}_{2001,SLA_i} \right)} \quad (1)$$

$$w_{SLA_i} = \frac{\left( \frac{\sum_{t=1}^{n} \text{Median Price}_{t,SLA_i}}{n} \right) \times \text{Total Dwellings}_{2001,SLA_i}}{\sum_{SLA_i}^{N} \left[ \left( \frac{\sum_{t=1}^{n} \text{Median Price}_{t,SLA_i}}{n} \right) \times \text{Total Dwellings}_{2001,SLA_i} \right]} \quad (2)$$

$$w_{SLA_i} = \frac{\left( \frac{\sum_{t=1}^{n} \text{Median Price}_{t,SLA_i} \times \text{Sales}_{t,SLA_i}}{\sum_{t=1}^{n} \text{Sales}_{t,SLA_i}} \right) \times \text{Total Dwellings}_{2001,SLA_i}}{\sum_{SLA_i}^{N} \left[ \left( \frac{\sum_{t=1}^{n} \text{Median Price}_{t,SLA_i} \times \text{Sales}_{t,SLA_i}}{\sum_{t=1}^{n} \text{Sales}_{t,SLA_i}} \right) \times \text{Total Dwellings}_{2001,SLA_i} \right]} \quad (3)$$

where Median Price is the median price of $SLA_i$, in time period t; Total Dwellings$_{2001}$ can be defined as the sum of free-standing houses, semi-detached homes and terraces, units or flats, and houses or units attached to other buildings in the year 2001; and Sales is the number of dwellings sold in $SLA_i$, in time period t.

The TIS 100 is capable of utilising a number of different "active" portfolio construction processes. One alternative is for the TIS 100 to ignore the investors' other asset holdings (e.g. to stocks, bonds and cash) and to simply optimise the EFM pools' target weights based on the risk and return attributes of the underlying assets. This can involve a wide variety of EFM-weighting strategies based on the TIS' 100 expectations of the future performance of certain geographies, asset types, and consumer cohorts, amongst other things. Consequently, these methodologies are likely to give rise to very different target portfolio outcomes in comparison to the passive techniques discussed previously.

Another more nuanced portfolio construction option involves the investor transmitting to the IID 102 information with respect to its existing asset exposures (e.g. to stocks, bonds, cash and (commercial and industrial) property), which the investor updates from time to time, and the TIS 100 subsequently optimising the investor's entire portfolio holding (i.e. including all asset-classes) with the addition of a pool of EFM assets, subject to the investor's preferences with respect to risk and return. In this manner, the TIS 100 can provide the investor with a "whole of wealth" asset-planning service, without necessarily managing the investor's direct allocations to the non-EFM asset-classes.

More specific illustrations of the TIS' 100 portfolio optimisation capabilities are disclosed below. These procedures form but one part of the TIS' 100 suite of algorithms and, subject to the requirements of investors, can be used to drive the target outputs that are transmitted to the TID 112. It is important to note here that the TIS' 100 full range of portfolio generation procedures encompass even more complex methodologies involving quite advanced functionalities (e.g. neural networks) and the material discussed herein should in no way limit the perceived scope of the TIS 100's activities. The nature of the actions that the TIS 100 undertakes also needs to be contextualised against its preference aggregation and specialised mandate capacities (particularly in the case of the former, whereby the TIS 100 must first determine what portfolio construction technique is most likely to maximise the utility of the largest number of pooled investors).

(a) Stand-Alone TIS 100 Portfolio Optimisation with Respect to Return

Under each stand-alone TIS 100 portfolio optimisation option, the investor 191 is not required to transmit to the IID 102 any additional information regarding their existing asset holdings. As such, the TIS 100 optimises the EFM portfolio as if it were the only asset held by the investor.

TIS 100 optimisations typically proceed by creating an objective mathematical function that is either maximised or minimised and then specify any constraints to which the objective function will be subject. These calculations are all performed by statistical applications embedded within the TIS 100.

To illustrate by way of example, assume the investor has communicated to the IID 102 an intention to secure a specialist investment mandate (i.e. one in which the target EFM pool produced by the TIS 100 is tailored specifically to the investor's preferences) comprising an $X capital commitment. Assume further that the investor has also inputted a preference for an expected return on its investment Y % higher than, say, the performance that it could expect to realise on a passive portfolio of EFMs. After extracting this information from the IID 102 and undertaking its portfolio optimisation procedures, the TIS 100 is able to communicate to the investor via the IID 102 the EFM pool's target portfolio characteristics (i.e. comprising specific weights to a range of asset-level attributes, such as various geographies and dwelling types) in addition to the portfolio's expected risk profile, assuming that the requested return is in fact achievable. Of course, this data is also transmitted to the TID 112 if the investor agrees to proceed with the transaction. The indicative portfolio construction techniques upon which this TIS 100 generated information is based are set out in the formulae below.

The objective function under option (a) is to minimise the EFM portfolio's risk subject to the investor's desired nominal portfolio return (e.g. 12% per annum), and any other constraints as illustrated below:

Minimise $$\sum_{i,j=1}^{n} w_i w_j \sigma_{i,j} \quad (a)$$

by choosing $w_i (i=1 \ldots n)$

Subject to the following constraints:

$$\sum_{i=1}^{n} w_i r_i = E(r) \quad (b)$$

$$\sum_{i=1}^{n} w_i = 1 \quad (c)$$

$$(\text{Optional}) w_i \geq 0 \quad (d)$$

where $w_i$ are the n percentage portfolio weights to each EFM or group of EFMs (e.g. the TIS 100 can optimise using post-code-level geographic units, which form the basis for the portfolio's asset inputs); n is the number of EFMs or number of groups of similar EFMs; $\sigma_{i,j}$ are the expected statistical correlations of returns between each EFM or group of EFMs; $r_i$ are the expected returns attributable to each EFM or group of EFMs; and E(r) is the expected portfolio level return.

The optimisation problem outlined above is solved by the TIS 100. In the event constraint (d) is not necessary, the TIS 100 processes the problem using Lagrangian mathematics to solve for the n unknown variables (i.e. the weight allocations to each individual EFM or group of EFMs). In the event constraint (d) is necessary, the TIS 100 solves the problem using quadratic programming techniques. These capabilities are embedded within the TIS' 100 statistical applications.

Equation (a) above is the TIS' 100 formula for the expected volatility of the EFM portfolio. The $\sigma_{i,j}$'s can be inputted into the equation by the TIS 100 automatically. Equation (b) states that the EFM portfolio's return must be set equal to the investor's preferred target. Again the $r_i$'s can be inputted automatically. Equation (c) simply states that the weights must add to 100% (that is, all capital must be allocated to EFMs in this stand-alone portfolio optimisation example). Inequality (d) is necessary in the event that there is an inability to take "short" positions in relation to EFMs, which is likely to be the case. A short position refers to the situation where an investor sells an asset before owning it (usually by borrowing that asset under an agreement to pay it back later) and then buys that same asset back in the future. It is the direct opposite (in an economic sense) of buying an asset in the ordinary course since the investor profits under a short sale when the price of the asset falls (rather than rises). It is desirable to provide such a facility to investors as derivative markets based on underlying EFM securities develop. In this preliminary case, inequality (d) is a necessary constraint on the optimisation process.

(b) Stand-Alone Optimisation with Respect to Risk

The TIS' 100 task in option (b) is similar to that outlined above except that the objective function and constraints are altered slightly. The actual methodology the TIS' 100 uses to determine the target portfolio weights is however essentially the same.

In this option, the TIS' 100 objective function is to maximise the portfolio level return (i.e. not to minimise its risk as above) subject to a desired level of risk, and any other constraints as illustrated below:

Maximise $$\sum_{i=1}^{n} w_i r_i \quad (a)$$

by choosing $w_i (i=1, \ldots, n)$

Subject to the following constraints:

$$\sum_{i,j=1}^{n} w_i w_j \sigma_{i,j} = E(\sigma) \quad \text{(b)}$$

$$\sum_{i=1}^{n} w_i = 1 \quad \text{(c)}$$

$$(\text{Optional}) w_i \geq 0 \quad \text{(d)}$$

where all the symbols have the same interpretation as above and $E(\sigma)$ represents the expected volatility of the portfolio defined in precisely the same fashion as it was in the objective function in (a) immediately above.

(c) Multi-Asset-Class Optimisation with Respect to Return

The TIS' 100 multi-asset-class optimisation procedures are conceptually similar to the stand-alone techniques outlined above except that the weights $w_i$ apply to all of the investment classes in the investor's proposed portfolio, including EFMs, and, say, stocks, bonds, cash and other real estate assets (where applicable). In addition, there may be a further constraint whereby the investor (such as a pension plan) stipulates an upper bound on their portfolio allocation to EFMs, as set out below.

The TIS' 100 optimisation problem becomes:
Minimise $$\sum_{i,j=1}^{n} w_i w_j \sigma_{i,j} \quad \text{(a)}$$

by choosing $w_i (i=1, \ldots, n)$
Subject to the following constraints:

$$\sum_{i=1}^{n} w_i r_i = E(r) \quad \text{(b)}$$

$$\sum_{i=1}^{n} w_i = 1 \quad \text{(c)}$$

$$(\text{Optional}) w_i \geq 0 \quad \text{(d)}$$

$$(\text{Optional}) w_{EFM} = x\% \quad \text{(e)}$$

where $w_{EFM}$ is the maximum weight attributable to the EFM pool as pre-specified by the investor; $w_i$ are the total portfolio weights attributable to the remaining asset-classes (e.g. stocks, bonds and cash), and all other symbols are as previously defined.

(d) Multi-Asset-Class Optimisation with Respect to Risk

In this second multi-asset-class option, the TIS' 100 objective function is modified slightly such that it maximises the investor's total portfolio level return (i.e. it does not minimise its risk as above) subject to a desired level of risk, and any other constraints as illustrated below:

Maximise $$\sum_{i=1}^{n} w_i r_i \quad \text{(a)}$$

by choosing $w_i(i=1, \ldots n)$
Subject to the following constraints:

$$\sum_{i,j=1}^{n} w_i w_j \sigma_{i,j} = E(\sigma) \quad \text{(b)}$$

$$\sum_{i=1}^{n} w_i = 1 \quad \text{(c)}$$

$$(\text{Optional}) w_i \geq 0 \quad \text{(d)}$$

$$(\text{Optional}) w_{EFM} = x\% \quad \text{(e)}$$

where all the symbols have the same interpretation as above.

3. The Asset Origination System ("AOS" 200)

Figure 4:
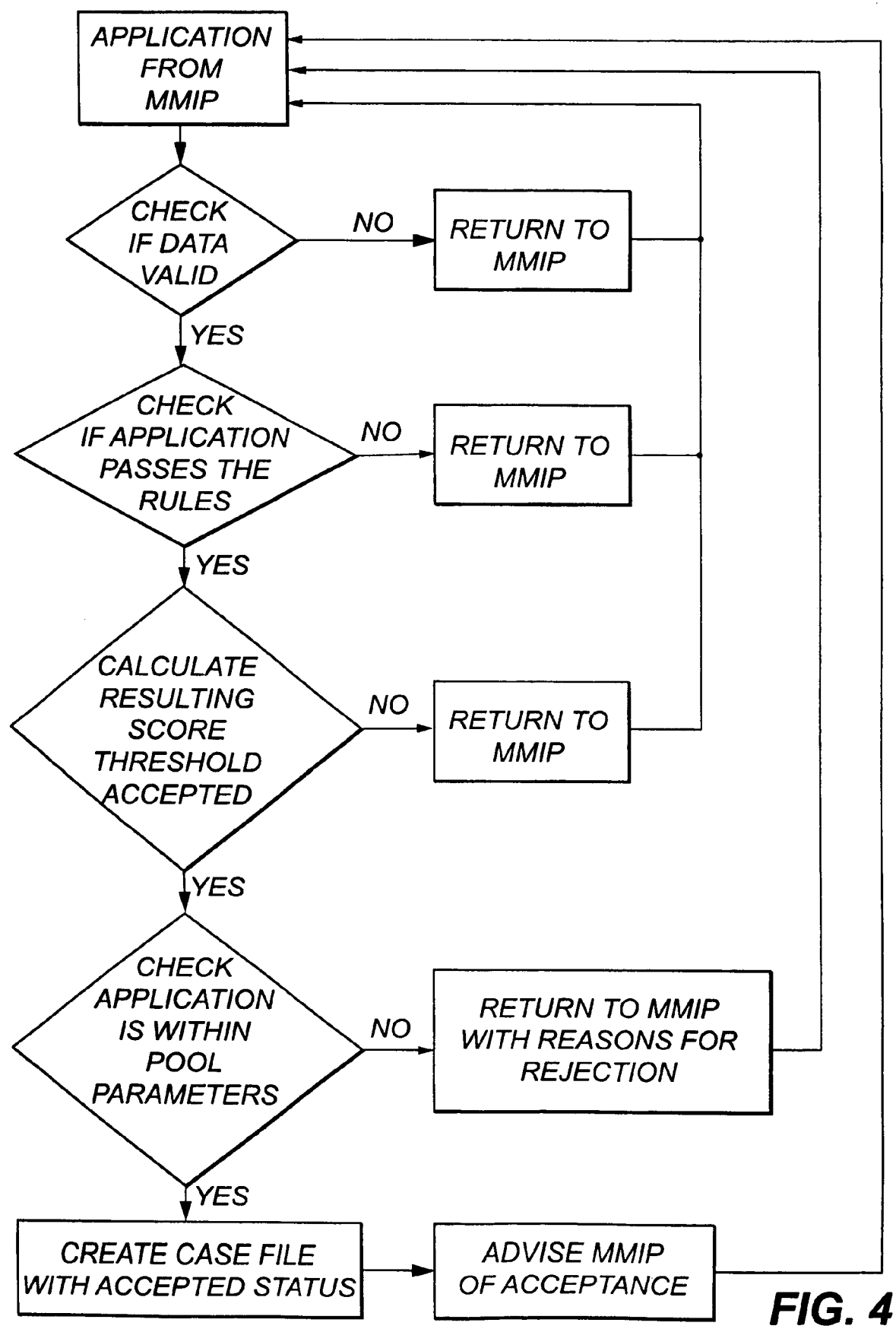
FIG. 4 is a flow chart which exemplifies the acceptance procedures.

Harnessing its electronic connections with the TID 112, AOD 202 and AWD 210, the AOS 200 employs a range of static and dynamic feed-back and feed-forward decision-rules in order to select in real-time EFM applications submitted to it via its distribution agents (i.e. the MMIPs 201). The AOS' 200 ultimate objective is to source EFM assets that most closely approximate the portfolio preferences stipulated by the TID 112 (and hence which satisfy the pre-specified portfolio desires of investors and, where applicable, UCPs 211, as inputted into the IID 102 and processed by the TIS 100). FIG. 4 exemplifies this process. The AOS 200 therefore compares in real-time the data that it extracts from the AOD 202 (in relation to the application characteristics that the MMIPs 201 input) with the target portfolio attributes and tolerance thresholds provided by the TID 112, and subject to the features of the EFM assets that the AOS 200 has already approved (as stored and extracted from the AWD 210), determines whether the submitted applications progress through to settlement. Based on its static and dynamic decision-rules, the AOS 200 is also responsible for managing the MMIPs' 201 remuneration systems, regulating the EFM contractual terms in order to source the appropriate assets and signalling to the MMIPs 201 changes in distribution and marketing needs by consumer cohort and geographic region. As a final task, the AOS 200 must interact with the AWD 201, and, once an EFM application has been approved, administer the transfer of capital from the UCPs 211 to the applicant that has successfully sought finance (via the MMIPs 201). The security that is provided by the applicant in exchange for the finance is the underlying EFM contract, which is, where applicable, held by the UCPs 211 for the duration of the warehouse period until such a time as the contracts are formally securitised (i.e. they are packaged into pools owned by the end-user investors). Of course, in a one-stage capital provision process the end-user investors can hold the assets from the very beginning of the asset-selection cycle.

In addition to static asset evaluation rules, the AOS 200 also utilises dynamic "feed-back" and "feed-forward" decision-rules (also known as "process control systems"), which rely on real-time electronic data transmissions from the AOD 202, the TID 112 and the AWD 210, in order to maximise the efficacy of its asset-selection activities. The AOS' 200 real-time decisioning procedures involve the computation of so-called distribution "errors" (e.g. deviations in the EFM application or wider portfolio characteristics relative to that which was targeted by the TID 112 through the TIS 100), which are used for the purposes of determining what asset evaluation actions the AOS 200 should take (e.g. accept, reject, or request more application information).

The two general steps that the AOS 200 undertakes when administering its decisioning systems involves at minimum:

(1) After extracting the MMIPs' 201 inputted data from the AOD 202, the AOS 200 measures the difference between the applicants' observed attributes and those of their collateral (which, in the technical process control lexicon, are known as "signal" or "disturbance" variables) and the AOS' 200 preferred EFM application characteristics based on its real-time assessment of differences between the TID's 112 targets and tolerance thresholds, and the actual (i.e. approved) application attributes stored in the AWD 210 (where the output of this latter AOS 200 assessment can be referred to as the "set point" variables); and, (2) The AOS 200 then inputs the differentials estimated in (1) between the "signal" and the "set point" variables into its decision rules and based on the outcomes of this process undertakes the required actions to either minimise errors observed prior to the actual "settlement" or final approval of the application, which can be classified as a "feed-forward" procedure, or minimise errors drawn from post-approval data, and thereby influence future asset-selection performance, which is a "feed-back" technique.

More specifically, the AOS' 200 "feed-forward" asset-selection processes include the use of any ex ante (i.e. pre application approval) target portfolio preferences that derive from the TID 112 to screen current EFM applications (albeit that the AOS' 200 simultaneous use of information from both the TID 112 and the AWD 210 encompasses elements of both "feed-forward" and "feed-back" process control); the dynamic modification of the EFM's contractual terms and conditions in real-time in response to application attributes inputted by the MMIPs 201 into the AOD 202 (e.g. an increase or decrease in the EFM's cost of capital based on the applicant's attributes), which in turn impact on the likelihood of the applicant accepting or rejecting the AOS' 200 proposed terms and conditions; ex ante MMIP 201 remuneration strategies structured to maximise the probability of the MMIPs 201 sourcing applications that most closely fit investors' portfolio requirements; and the calibration of the content, structure and cost of EFM marketing programmes in order to influence future EFM application patterns (all of which are known as "manipulated" variables).

By way of contrast, AOS 200 "feed-back" asset-selection processes include any ex post (i.e. post application approval) changes to the EFM's terms and conditions, MMIP 201 remuneration systems, the content, structure and cost of EFM marketing programmes, and the AOS' 200 real-time decisioning outcomes (which will be in part a consequence of ex post data collected from the AWD 210) that are attributable to the characteristics of approved EFM applications. In such events, the AOS' 200 process control system computes the differences between the target and observed variables and undertakes the appropriate asset-selection actions. This involves accepting, rejecting or referring an application in real-time, or electronically transmitting information directly back to the IID 102 in order to effect changes to the TIS' 100 outputs and hence the data stored in the TID 112.

All of the AOS 200 steps above are undertaken on either a batch or real-time basis by an integrated computer system that has been designed to manage advanced process control technology.

In summary, the AOS 200 uses its electronic links with the TID 112, AOD 202, and AWD 210 in combination with its static and dynamic feed-back and feed-forward decision-rules to minimise fluctuations between the target EFM portfolio characteristics generated by the TIS 100 and the actual EFM applications that are approved. Practically speaking, this involves several subsidiary processes, including:

(1) Extracting the MMIPs' 201 inputted application data and processing it against the AOS' 200 simple static rules, and then subsequently against more sophisticated dynamic rules that involve comparisons with the target portfolio characteristics contained within the TID 112 and the attributes of previously approved applications held in the AWD 210;

(2) Transmitting signals to the MMIPs 201 to adjust the content, structure and cost of their EFM marketing programmes to regulate EFM demand by geography and consumer cohort;

(3) Modifying the EFM contracts' terms and conditions on a batch basis and in real-time such that approved applications most closely match the preferences of investors, as inputted into the IID 102;

(4) Inputting information (oftentimes reflecting asset-selection errors) back into the IID 102 so as to influence the outputs produced by the TIS 100 and hence the data stored in the TID 112;

(5) Dynamically managing the MMIPs' 201 remuneration system such that they have strongest possible incentive to source EFMs applications that satisfy the expectations of the TID 112 while also continuously calibrating the MMIPs' 201 remuneration parameters though time in response to their observed performance; and, (6) Settling EFM transactions by transferring capital from the UCPs 211 in exchange for security (i.e. the mortgage contracts), which represent the legal embodiment of the end-user investors' claims over the underlying collateral assets.

The sampling of AOS 200 procedures outlined above will now be examined in more detail and henceforth known as AOS Processes 200/1-200/6.

2.1 AOS Process 200/1

The information stored in the AOD 202 supplies the AOS 200 with access to a very detailed suite of characteristic-based data covering the EFM applicant's profile (e.g. age, income, current address, credit history, proposed property's location, proposed property type, etc), which has been electronically inputted into the AOD 2020 by the MMIPs 201. The AOS 200 electronically extracts the relevant packets of application data and in real-time begins by processing this data through a series of static decision rules. For example, the initial AOS 200 rules data encompass the following:

(1) The applicant's age;
(2) The property-type (e.g. fully detached, semi-detached, or attached);
(3) The tenure type (e.g. freehold vs leasehold);
(4) The property's proposed address (this may involve one post-code, or the applicant selecting an SLA that encompasses multiple post-codes);
(5) The applicant's current income;

(6) Whether the EFM will be a senior, stand-alone mortgage, or subordinated to a prime interest-bearing loan;
(7) Whether the EFM is being used for a first property purchase, to upgrade from an existing home, to refinance the household's current mortgage, or to release equity for consumption purposes;
(8) The type of prime interest-bearing loan and interest rate (e.g. a standard variable-rate loan with a 8.5% interest rate), where applicable;
(9) The requested loan-to-value ratio ("LVR") on the prime interest-bearing loan, where applicable (e.g. 50%, 60%, 70%);
(10) The requested LVR on the EFM (e.g. 10%, 15%, 20%); and,
(11) The applicant's minimum deposit expressed as a proportion of the value of the proposed property (e.g. 3%, 5%, 10%).

Note that the rules data outlined above are non-limiting examples of the rules that AOS 200 will require in order to complete its processing function. It is also likely that the AOS 200 will receive additional data stipulating whether or not the applicant in question has been approved for the purposes of their prime interest-bearing loan. This data can be received by the AOS in advance of, or subsequent to, processing the rules in order to determine whether the application progresses to the preliminary approval phase.

Once the rules data have been extracted by the AOS 200 from the AOD 202, the various static and dynamic feed-forward and feed-back rules can be processed. By way of illustration, these steps can involve the following automated real-time procedures:

Step 1: MMIP 201 inputs EFM application data into AOD 202.

Step 2: AOS 200 identifies the arrival of new application data via a real-time electronic connector. AOS 200 consults rules and subject to their requirements, extracts relevant application data from the AOD 202.

Step 3: AOS processes initial rules. Simple AOS 200 rules include the following:
R1: Is the applicant's age over 18?
If yes, proceed to next rule.
If no, stop process, store rejection data in the AOD 202 and signal rejection to MMIP 201.
R2: Is the applicant's tenure type freehold or leasehold?
If freehold, proceed to next rule.
If leasehold, stop process, store rejection data in the AOD 202 and signal rejection to MMIP 201.
R3: Can the applicant supply the minimum required deposit?
If yes, proceed to next rule.
If no, stop process, store rejection data in the AOD 202 and signal rejection to MMIP 201.
R4: Is the application for a senior, stand-alone EFM, or for an EFM that will be subordinated to a prime interest-bearing loan?
If the application is for a senior, stand-alone EFM, extract additional data from TID 112 and AWD 210 and determine whether any further stand-alone EFMs can be accepted.
If yes, proceed to next rule.
If no, stop process, store rejection data in the AOD 202 and signal rejection to MMIP 201.
If the application is for an EFM that will be subordinated to a prime interest-bearing loan, extract additional data from TID 112 and AWD 210 and determine whether any further subordinated EFMs can be accepted.
If yes, proceed to next rule.
If no, stop process, store rejection data in the AOD 202 and signal rejection to MMIP 201.
R5: Are both the property-type and its geographic location within the acceptable limits as determined by reference to the TID 112 and the AWD 210?
If yes, proceed to next rule.
If no, stop process, store rejection data in the AOD 202 and signal rejection to MMIP 201.

Step 5: If the application fails to successfully progress through the rules, the evaluation process stops once the AOS 200 has stored the rejection data in the AOD 202 and electronically transmitted its decision to the MMIP 201.

Step 6: If the application does satisfy all the rules, the AOS 200 transmits its approval decision in real-time to the MMIP 201 while at the same time sending the approved application data to the AWD 210. The application has now moved on to the settlement phases of the processing life-cycle.

The specific methodologies that the AOS 200 uses when automatically processing some of its more complex feed-back and feed-forward decisioning requirements (as referred to in illustrative Rules 4 and 5 above) are now discussed in more detail.

In order for the AOS 200 to determine whether an EFM application should be accepted or rejected, an initial computation of differences (or errors) is undertaken between the idealised portfolio characteristics stored in the TID 112 and the previously approved application attributes that are held within AWD 210. The output of this analysis is then processed by the AOS 200 against the data extracted from the AOD 202, which will in turn inform the AOS 200 as to what actions are appropriate (e.g. accept, reject or request more information). In this first series of algorithms, the AOS 200 estimates whether the application information will satisfy the preferences of investors (based on the target and actual attributes stored in the TID 112 and the AWD 210, respectively), assuming that the application in question contains the standard terms and conditions. In particular, the calculation of the error function, e, will be of the general form, $$\sum_{i=1}^{n} F_i = (TC_i, C_i) = e, \qquad (4)$$

where the actual function is based on differences between the target application characteristics (which in turn are a function of the AOS 200 estimated differential between the attributes stored in the TID 112 and the AWD 210, as outlined previously) and the specific attributes that apply to the applicant in question. That is, $$\sum_{i=1}^{n} K_i (TC_i - C_i) = e, \qquad (5)$$

where i are the 1 to N application characteristics, and $f_i$ is a function of two variables; the target characteristic, $TC_i$, for attribute, i, and the actual applicant characteristic, Ci. The assessed characteristics, i, include, but are not limited to: the applicant's age, sex, income, marital status, credit history, current address, previous transaction history, income leverage, loan-to-value ratio (i.e. including the first mortgage, where one exists); the dwelling's location, type, price, size, land-to-value ratio; and, the MMIP's 201 location, network membership, and prior EFM origination history. $K_i$ are constants used to weight the relative characteristics, and X is as denoted the upper bound of the sum of acceptable total divergences, e, from the AOS 200 estimated application preferences, $TC_i$.

The algorithm's function is utilised in the following fashion: If e>X, then the application will be rejected and does not graduate to the next stage of the evaluation process. This information is communicated to both the AOD 202 and the MMIP 201 that sourced the application in the first place. In order to control for fraudulent behaviour, the AOS 200 also compares all future applicant information against prior submissions that have been stored by the AOD 202 to ensure that the consumer and/or the MMIP 201 has/have not manipulated key variables (e.g. income) to increase the probability of the application's success. If, on the other hand, e≦X, then the application passes through to the second AOS 200 evaluation stage, which involves the use of a more sophisticated contract calibration algorithm that is responsible for determining the contract's terms and conditions, and the relevant MMIP's 201 compensation.

2.2 AOS 200 Process 200/2

In the event that the application satisfies AOS 200 Process 200/1 and e≦X, the AOS 200 has the capacity to process a more sophisticated round of contract calibration rules that in effect pose the question, "On what specific terms and conditions should this application be approved?". In response to this question, the AOS 200 can optimise the EFM contract's terms and conditions (e.g., maturity dates, the capital appreciation claim, the capital depreciation claim, the interest rate, the rental yield, and/or the prepayment provisions) based on the magnitude of the difference between the applicant's observed characteristics and the preferred attributes determined in analysis undertaken in AOS 200 Process 200/1 based on the difference between the target and actual attributes stored in the TID 112 and the AWD 210, respectively.

Once the terms and conditions on which the EFM is offered have been computed, the AOS 200 electronically transmits this information to the MMIP 201 by way of a real-time connection, which then informs the applicant of the final contract details. Concurrent with this process, AOS 200 transmits the relevant application data to the AOD 202. Even if the applicant decides to reject the EFM offer, the AOD 202 will have stored a record of the terms and conditions in question for future evaluative purposes.

In order to compute the EFM's exact terms and conditions, the AOS 200 employs an algorithm that involves an additive function across the different characteristic-based variables. The calculation of the EFM's terms and conditions function, P, will then be of the form:

$$\sum_{i=1}^{n} F_i(TC_i, C_i) = P. \tag{6}$$

The algorithm's actual structure will be based on differences between the preferred attributes determined in analysis undertaken in AOS 200 Process 200/1 and those that are observed in the application itself:

$$\sum_{i=1}^{n} K_i(TC_i - C_i) = P, \tag{7}$$

where i, $f_i$, $TC_i$, and $C_i$ are as defined above, $K_i$ are new constants used to weight the relative characteristics, and P is the maximum value of the differences.

To ensure that each contract is calibrated appropriately, the most onerous possible terms utilised in equation (5) are once again employed, and if:

$$\sum_{i=1}^{n} K_i(TC_i - C_i) < P, \tag{8}$$

the AOS 200 chooses to communicate a multiplicity of contractual possibilities back to the MMIP 201. (Observe that if $$\sum_{i=1}^{n} K_i(TC_i - C_i) = P$$

then the equation (5) terms are the only contractual opportunity available to the applicant as their characteristics were at the limit of the calculated error bands and AOS 200 requires the most attractive possible terms and conditions in exchange for approving the application.)

Over and above changes the maturity date, interest rate, rental yield, or prepayment provision, these contractual possibilities include, but are not limited to (with reference to the description of the EFM contract parameters):

(1) a 1:1:1 EFM cost of capital;
    (2) a 1:1:0 EFM cost of capital;
    (3) a 1:1.5:0 EFM cost of capital
    (4) a 1:2:1 EFM cost of capital;
    (5) a 1:2:2 EFM cost of capital;
    (6) a 1:2:0 EFM cost of capital;
    (7) a 1:3:1 EFM cost of capital;
    (8) a 1:3:2 EFM cost of capital;
    (9) a 1:3:3 EFM cost of capital;
    (10) a 1:3:0 EFM cost of capital; or
    (11) an x:y:z EFM cost of capital in addition to a standard time-dependent interest rate, and all derivations therein.

Either the AOS 200 or the MMIP 201 can then interact iteratively with the applicant (the former is possible with an Internet-based EFM distribution system in which the consumer interfaces directly with the AOS 200 without the need for any MMIP 201 intermediaries) to determine the applicant's contractual preferences by altering the terms and conditions of the EFM contract until such a point as:

$$\sum_{i=1}^{n} K_i(TC_i - C_i) = P, \tag{9}$$

which represents the bounded maximisation of the calibration function in which some of the $C_i$ variables have been manipulated by either the MMIP 201 or the AOS 200.

2.3 AOS 200 Process 200/3

In tandem with AOS' 200 assessment in Process 200/1 as to whether applications should be transferred to the contract calibration stage or rejected outright, the AOS 200 also transmits targeted marketing feed-back to the MMIPs 201 as a result of analyses undertaken by the AOS' 200 advertising output algorithm. This algorithm monitors the application sourcing activities of each of the MMIPs 201 relative to the forecasts of the AOS 200, where these expectations are dynamically determined by the AOS 200 over time and conditioned on assumptions regarding the application sourcing impact of relative rates of advertising spend. The AOS' 200 advertising output algorithm compares the performance of each MMIP 201 with that which was forecast, and operates on a percentage tolerance basis as a function of different application characteristics. The algorithm's two primary computations relate to: (1) the difference between the actual and expected sum or rate of application rejections; and, (2) the difference between the actual and expected sum or rate of application approvals. The sum of rejections is given by:

$$\sum_{i=1}^{n} \frac{R_i}{TAP_i} > T_1. \tag{10}$$

The rate of rejections is simply the sum of rejections over a given time period:

$$\frac{1}{t_{1...n}} \sum_{i=1}^{n} \frac{R_i}{TAP_i} > T_2. \tag{11}$$

The change in the rate of rejections is equal to the difference in the rate rejections over time:

$$\frac{1}{t_{k+1...n}} \sum_{i=k+1}^{n} \frac{R_i}{TAP_i} - \frac{1}{t_{1...K}} \sum_{i=1}^{k} \frac{R_i}{TAP_i} > T_3, \tag{12}$$

where $R_i$ denote rejections of applications based on each application characteristic, i, that can be influenced by altering the value and composition of advertising; $TAP_i$ represents the total number of applications sourced, and $T_i$ are the tolerances associated with the ratio of rejections during any given period. In order to determine whether the application sourcing activities of any MMIP 201 have moved in line with that which was estimated by the AOS 200, the algorithm can undertake computations of the following kind:

$$\frac{1}{t_{1...n}} \sum_{i=1}^{n} \frac{E(R_i) - R_i}{TAP_i} > T_2, \tag{13}$$

where $E(R_i)$ is the AOS' 200 expected number of rejections. The introduction of expectations enables the AOS 200 to more closely monitor the performance of each or all MMIPs 201, and can be used in the context of inequalities (10), (11) and (12) immediately above.

Variables that can be altered through the use of advertising include the applicant type (e.g., first time buyers, upgraders, refinancers and retirees), and their age, income and location. By focussing on these application identifiers, the AOS 200 is (through its associated MMIPs 201) able to exert an influence on the actual approved pool of applications' exposures to certain demographic cohorts, dwelling types and geographic regions.

In particular, the output of inequality (10) above informs the AOS 200 of differences in the ratio of rejected applications to the total number received relative to its preferred tolerance parameter; inequality (11) gives the rates of change in this ratio over time; and inequality (12) provides the first derivative of the rates of change computed in inequality (11). While higher order derivatives can also be utilised, the value extracted from these calculations is a decreasing function of the order of the derivative.

All advertising algorithm outputs outlined above are delivered to the AOD 202 and when the tolerances are greater than $T_i$, the AOS 200 notifies the MMIPs 201 of the results and thereby provides them with information required to adjust their advertising programmes to improve application sourcing.

The insights contained in the approval data (stored within the AOD 202) are materially different to those relating to the rejections. The acceptances data indicate the number and rates of EFM applications that have been approved by the AOS 200 over time. These in turn highlight the types of applicants that are prepared to use EFMs and which have proved to be acceptable to the AOS 200. The kinds of algorithms that are used to analyse this data include the following inequalities:

$$\sum_{i=1}^{n} \frac{A_i}{TAP_i} > T_4 \tag{14}$$

$$\frac{1}{t} \sum_{i=1}^{n} \frac{A_i}{TAP_i} > T_5 \tag{15}$$

$$\frac{1}{t_{k+1...n}} \sum_{i=k+1}^{n} \frac{A_i}{TAP_i} - \frac{1}{t_{1...K}} \sum_{i=1}^{k} \frac{A_i}{TAP_i} > T_6 \tag{16}$$

$$\frac{1}{t_{1...n}} \sum_{i=1}^{n} \frac{E(A_i) - A_i}{TAP_i} > T_2, \tag{17}$$

2.4 AOS 200 Process 200/4

Process 200/4 is one of the AOS' 200 feed-back control systems that minimises the estimated errors associated with the attributes of the ex post pool of approved EFM applications stored in the AWD 210 relative to the investors' ex ante preferences as originally specified by the TID 112.

As noted previously, the AOS 200 extracts from the AOD 202 what is essentially a mixture of regular and random multi-dimensional data input signals from the MMIPs 201 (random in the sense that it is difficult to predict whether a particular applicant at a given time will be, for example, a first-time buyer, an existing owner, or an elderly home owner; whether they are looking to take out an EFM against a detached house, terrace or unit; and the geographic location of the property in question (e.g. Sydney, Melbourne, Brisbane, Adelaide and Perth), to name just a few potential parameters. The estimated differences between the approved application attributes and the characteristics that were requested by the TID 112 are then fed back to the IID 102 by the AOS 200, such that future computations of the TIS 102 can account for the evolving complexion of the actual pool of approved EFM contracts. It is self-evident that this feed-back mechanism is important to the ongoing ability of the AOS 200 to optimise its asset-selection activities and satisfy the end-user investors' requirements.

There are at least five potential methods of feed-back control that the AOS 200 uses, which are known as: (1) two position; (2) proportional; (3) proportional plus integral; (4) proportional plus derivative; and (5) proportional plus integral plus derivative. In this context, the AOS' 200 "manipulated variables" include the EFM contract's terms and conditions, the remuneration supplied to the MMIPs 201, the quantum of finance available to each applicant (i.e. the maximum LVR), and any advertising signals transmitted to the MMIPs 201. Each of the manipulated variables is used by the AOS 200 for administering the various different control methodologies, examples of which are outlined in time-steps below:

1. In "two position" control, if e<A, then Xapplies, or if e>B, Y applies, where A and B are pre-determined AOS 200 parameters, and X and Y are the manipulated variables. While this is the simplest form of AOS' 200 process control, it is also the most rudimentary.
2. With AOS 200 "proportional" control, the manipulated variable, p(t), is determined by a ratio, $K_p$, of the error plus a bias value, $\bar{p}$, where the bias value is the state the manipulated variable is in when there is no error. The error itself is defined as the target value less the actual value of the measured variable, while $K_p$ is the control ratio applied to the proportional error. This implies:

$$p(t) = \bar{p} + K_p(TC_k - C_k) \tag{18}$$

3. In AOS 200 "integral" control, the manipulated variable is a ratio of the previous errors (excluding the current error), plus a bias value, $\bar{p}$. $K_I$ is the control ratio applied to the sum of the previous errors for the integral action, and $\tau_I$ denotes the reset time utilized for the integral action (e.g. the integral control is applied every two weeks to all previous errors).

Hence:

$$p_n = \bar{p} + K_I \frac{\Delta t}{\tau_I} \sum_{k=1}^{n-1} e_k, \tag{19}$$

where the error, $e_k$, is equal to $TC_k - C_k$ and all other variables are as previously defined.

4. In both "proportional and integral" control, the manipulated variable, $p_n$, is a ratio of all previous errors, $$\sum_{k=1}^{n-1} e_k,$$

including the current error, $e_n$, plus a bias value, $\bar{p}$. As before, $\tau_I$ is the reset time utilized for the integral action. Accordingly:

$$p_n = \bar{p} + K_p e_n + K_I \frac{\Delta t}{\tau_I} \sum_{k=1}^{n-1} e_k. \tag{20}$$

5. If the AOS 200 utilises the most sophisticated "proportional-integral-derivative" ("PID") form of control, the manipulated variable, $P_n$, is a ratio of all previous errors, $$\sum_{k=1}^{n-1} e_k,$$

plus a proportion of the most recent error change, $$\frac{\tau_D}{\Delta t}(e_n - e_{n-1}),$$

and the bias value, $\bar{p}$. $K_D$ is the control ratio applied to the most recent error. Once again, $\tau_D$ is the reset time utilized for the derivative action. Thus:

$$p_n = \bar{p} + K_p e_n + K_I \frac{\Delta t}{\tau_I} \sum_{k=1}^{n-1} e_k + K_D \frac{\tau_D}{\Delta t}(e_n - e_{n-1}). \tag{21}$$

To take a simple example of the AOS 200 feed-back control options outlined above, the AOS 200 application error measurements are inputted into its PID system, which gives rise to the resultant control actions that are transmitted directly back to the IID 102. By way of practical illustration, Table 3 below outlines a PID control function where the EFM portfolio's average target dwelling price is $500,000 (as determined by the TIS 100 and communicated to the TID 112) and the average value of AOS' 200 approved dwellings is less than that which is desired. Table 3 shows that the AOS' 200 estimate of the PID control parameter, $p_n$, changes over time based on the errors that it computes. For the sake of simplicity, it is assumed that that $\tau_D$ and $\tau_I$ are equal to t (which means that $\Delta t \div \tau_I = 1$ and $\tau_I \div \Delta t = 1$), and that $K_p$, $K_I$ and $K_D$ equal 1, implying that $\bar{p} = 0$. These are slightly unrealistic assumptions, given that $K_p$, $K_I$ and $K_D$ may be too large for a system of this nature. Also observe that $K_I$ dominates the determination of $p_n$.

TABLE 3

Illustrative AOS 200 Feed-Back Control Case Study

| $\Delta t$ | $1/\Delta t$ | n | Actual Price | Error $e_n$ | $e_n - e_{n-1}$ | $\sum_{k=1}^{n-1} e_k$ | $p_n$ |
|---|---|---|---|---|---|---|---|
| 1 | 1.000 | 1 | $400,000 | $100,000 | | | 100,000 |
| 4 | 0.250 | 2 | $300,000 | $200,000 | $100,000 | 100,000 | 400,000 |
| 5 | 0.200 | 3 | $200,000 | $300,000 | $100,000 | 300,000 | 700,000 |
| 7 | 0.142 | 4 | $300,000 | $200,000 | $(100,000) | 600,000 | 700,000 |
| 10 | 0.100 | 5 | $350,000 | $150,000 | $(50,000) | 800,000 | 900,000 |

The output from the control algorithm $p_n$ is then transmitted by the AOS 200 to the IID 102. In turn, the TIS 100 extracts this information from the IID 102 to determine the target value of the originated dwellings, which it outputs to the TID 112. In this example, as the error becomes larger, the signal $p_n$ to the IID 102 also rises indicating that the target price must increase to ensure that the approved EFM portfolio's average price approximates the original $500,000 set point. With the $K_P$, $K_I$, $K_D$, $\tau_D$ and $\tau_I$ parameters correctly calibrated, the output $p_n$ can be directly added to the target price or any other manipulated variable, such as the dwelling's location, size or type, to name just a few.

2.5 AOS 200 Process 200/5

In AOS 200 Process 200/5, the AOS 200 uses a remuneration algorithm to determine the precise quantum and duration of payments that it makes to the MMIPs 201. In this procedure there are a minimum of two constituent elements to the MMIP's 201 compensation: (1) an upfront charge that is paid by the applicant; and, (2) the ongoing trailing commissions provided by the AServS 300. The primary Process 200/5 computations are undertaken by the AOS 200, with subsidiary computations performed by the AServS 300 over the life of the approved applications. The key factors driving the MMIP's 201 remuneration include: (1) how close the sourced application is to AOS's 200 ex ante preferences as determined with reference to the characteristics stored in the TID 112 and the AWD 210; (2) the historical performance of the MMIP 201 relative to the expectations of the AOS 200; and (3) the investment returns delivered by the EFM over its lifetime.

In order to estimate the MMIP's 201 optimal compensation package, MR, the AOS 200 uses an algorithm to compute the MMIP's 201 application sourcing performance, and subsequently a remuneration reduction parameter, MRR, which is structured such that the larger the application's divergence from the target criteria, the greater the reduction in the MMIP's 201 remuneration, as given by the following:

$$\sum_{i=1}^{n} K_i(TC_i - C_i) = MRR. \quad (22)$$

The AOS 200 defines the MMIP's 201 total compensation as the maximum remuneration less the reduction parameter; viz., MR=Max Remuneration−MRR. As the AOS 200 inputs historical data on the behaviour of the various MMIPs 201 into the AOD 202, it can calibrate their incentive structures more intelligently by rewarding past outperformance. Here the end-user investors in the EFM pools will likely be most concerned with at least three variables: (1) the rate of return attributable to each collateral asset (i.e. dwelling); (2) the duration of EFM repayment period, which determines the distribution of the pools' cash-flows; and (3) the contribution of each MMIP 201 to the pool's face value (i.e. the total value of the applications they are responsible for sourcing as a proportion of the total pool value). The difference between each MMIP's 201 performance and that attributable to the average MMIP 201, to highlight just one benchmark, allows the AOS 200 to estimate the Remuneration Adjustment Factor ("RAF"), which is a key input into the MMIP's 201 total compensation, using the following base-case algorithm:

$$K_1(ROR_i - ROR_{Average}) + K_2(Duration_i - Duration_{Average}) + K_3(Valuation_i - Valuation_{Average}) = RAF \quad (23),$$

where ROR denotes the rate of return attributable to the MMIP's 201 EFMs; Duration refers the MMIP's 201 average EFM holding period; and Valuation is the total face value of EFMs that the MMIP 201 has contributed to the pool.

$$MR = (Max\ Remuneration - MRR) \times RAF \quad (24)$$

With the MMIP's 201 compensation parameters computed, the AOS 200 multiplies the percentage outputs by the face value of the EFMs to calculate the upfront origination fee paid by the applicant. At the same time, the AOS 200 communicates the trailing metrics determined in equation (24) above to the AServS 300 to allow it to compute the value of the ongoing payments that will need to be made to the MMIPs 201.

2.6 AOS 200 Process 200/6

After completing AOS 200 Processes 200/1 through 200/5, the AOS 200 finalises in real-time the EFM applications' terms and conditions and transmits this information to the AOD 202, and, ultimately, via the MMIP 201, to the end-user applicant (assuming that the MMIP 201 intermediates between the applicant and the AOS 200). The AOS 200 also electronically transmits all of the application-specific data to the AWD 210 so that it has a complete record of the attributes of the assets that have been approved. In the context of finalising the transaction, the AOS 200 needs to interface with the MMIP 201 right through to the date of the application settlement, as there may be adjustments to the quantum of funds lent and/or the collateral asset (i.e. property) valuation between the time of application approval and the transaction close. In the event that there are alterations to any of these parameters, the bounded maximisations in AOS 200 Processes 200/1 and 200/2 will be re-run and the results transmitted aback to the AOD 202 and MMIP 201.

On the date of the transaction settlement, the AOS 200 facilitates the transfer of the financial capital by directly communicating information about the quantum of capital that needs to be drawn-down to the AWD 210 and hence the UCPs 211. Upon receipt of this data, the UCPs 211 release the funds for transfer to the applicant. Concurrently, the AOS 200 transmits the relevant settlement data to the AOD 202, MMIP 201, and AWD 210. At this point, the AWD 210 has all the information relating to the application characteristics (e.g. age, income, credit history, marital status, dwelling type, price, size, location etc) and the date on which it was settled. As a final task, the AOS 200 communicates the settlement information to the IID 102, which enables the TIS 100 to refine the TID 112 dynamically through time as the applications are approved. As discussed, this continuous feedback-loop minimises any divergences between the target portfolio characteristics and the actual approved pool of EFM applications by allowing the TIS 100 to adjust its investment preferences with reference to the approved application attributes.

4. The Asset Securitisation System ("ASS" 400)

At a time the ASS 400 determines either automatically via pre-specified parameters (e.g. once a certain number or value of EFMs have been sourced, or a particular period of time has elapsed, as revealed by reference to the AWD 210 and the TID 112), or on a discretionary basis by the SM, the ASS 400 utilises its real-time electronic interfaces with the TID 112 and the AWD 210 to compare the characteristics of the EFMs that have been actually approved with the updated investor preferences contained in the TID 112 (recall that these are being continuously refined over time as new information is inputted into the IID 102). The ASS 400 then processes a series of static and dynamic feed-back and feed-forward decision rules to determine what actions, if any, are required in order to optimise the structure of the investment pool comprising the approved EFMs in a manner that most closely matches the preferences of the end-user investors as stored in the TID 112 (e.g. attaching different types of financial rights to the EFM pools, restructuring the cash-flow claims of the underlying EFM contracts (into, for example, their principal and income components), or reconstituting the pools using various active and passive optimisation procedures (similar to those previously disclosed as part of the TIS 100 targeting methodologies). This also involves the ASS 400 transferring the originated EFM assets from a warehouse vehicle controlled by the UCPs 211 (who in this scenario would have supplied the AOS 200 with underwriting capital on a relatively short-term, intermediation basis) into the final investment portfolio that is to be marketed to third-party investors, or, in the case of a more simple one-stage capital provision process (whereby the original providers of the underwriting capital are the same investors who intend to hold onto the EFM assets over the long-term), simply calibrating the characteristics of the existing investment pool in which the EFM assets have been held for the duration of the AOS' 200 asset-selection process.

For the avoidance of doubt, it should be made clear that as is the case with the IID 102, TID 112, and AOD 202, the AWD 210 is a computerised database connected by way of electronic links to the AOS 200 and the ASS 400. As noted previously, the AWD 210 maintains details of all the AOS 200 approved applications that are being held as security by the UCPs 211 (and which were originally sourced by the MMIPs 201). These characteristics are collected by the MMIPs 201 and inputted into the AOD 202 (typically via an Internet-based interface) as part of the AOS 200 asset-selection process. Once approved, the application data is transmitted by the AOS 200 to the AWD 210 for the purpose of aggregation, and, if appropriate, subsequent disaggregation, wherein the EFMs can be repackaged and on-sold to their long-term holders.

The characteristics collected and stored in the AWD 210 include the following:

(1) The applicant's age;
(2) The property-type (e.g. fully detached, semi-detached, or attached);
(3) The tenure type (e.g. freehold vs leasehold);
(4) The property's address;
(5) The applicant's current income;
(6) The applicant's credit history;
(7) Whether the EFM is a senior, stand-alone mortgage, or subordinated to a prime interest-bearing loan;
(8) Whether the EFM was used for a first property purchase, to upgrade from an existing home, to refinance the household's current mortgage, or to release equity for consumption purposes;
(9) The type of prime interest-bearing loan and interest rate (e.g. a standard variable-rate loan with a 8.5% interest rate), where applicable;
(10) The LVR on the prime interest-bearing loan, where applicable (e.g. 50%, 60%, 70%);
(11) The LVR on the EFM (e.g. 10%, 15%, 20%); and,
(12) The applicant's deposit expressed as a proportion of the value of the proposed property (e.g. 3%, 5%, 10%).

The ASS 400 continually monitors the AWD 210 subject to its assorted decision-rules such as the UCPs' 211 limits stored in the AWD 210 and/or dynamic investor acceptance preferences contained in the TID 112. As soon as the AWD 210 stored characteristics (e.g. minimum levels of portfolio diversification) reach their acceptable levels, the securitisation processes outlined above commence. Here it is once again worthwhile noting that ASS' 400 final portfolio construction algorithms encompass all of the procedures used by the TIS 100 to generate the idealised portfolio holdings that it outputs to TID 112 based on informational inputs supplied by the IID 102, as previously disclosed.

Once the securitisation process has been completed, the ASS 400 transfers all of the relevant EFM contract data from the AWD 210 and the Asset Servicing Database ("AServD") 302 onto the Asset Management Database ("AMD") 502. Concurrently, the ASS 400 determines the remuneration of the UCPs 211—in the event that they are holding the EFMs on a short-term intermediation basis—via proceeds realised from the securitisation event.

5. The Asset Servicing System ("ASS" 300)

The AServS 300 is responsible for all of the underlying contracts' administration requirements during their life, which are in turn outsourced to third-party Asset Servicing Information Providers ("ASIPs") 301. These demands may involve processing variations to the contract's terms and conditions that are requested by the AMS 500, administering refinancings of the first and subsequent mortgages, events of default, prepayments, renovations to the properties, ongoing management of commissions paid to the MMIPs 201, and the processing of repayment cash flows through to end-user investors in conjunction with the AMD 502. Any data relating to the contract servicing events is communicated by the ASIPs 301 to the AServD 302, which then relays the details onto the AServS 300. In turn, the AServS 300 interfaces with both the AWD 210 during the warehouse period, and the AMD 502 once the contracts have been sold to third-parties. If the AMS 500 decides that it will make adjustments to the EFMs' terms and conditions (e.g., maturity dates, the capital appreciation claim, the capital depreciation claim, and/or the prepayment provisions), it transmits this information to AServS 300 through the AServD 302, which then executes the instructions. Similarly, if either the AMS 500 or the AOS 200 wishes to make adjustments to the trailing commissions paid to the MMIPs 201, these will be communicated for direct action through the AServD 302 and onto the AServS 300. The AServD 302 also receives pool valuation information from the AMS 500 which it combines with the MMIP 201 trailing commission information to ensure that the MMIP's 201 can be remunerated based upon a proportion of the ongoing pool valuation.

6. The Asset Management System ("AMS" 500)

This final component of the Overall System 600 optimises the risk-return profiles of the securitised EFM pools. As discussed, these pools were originally sourced and structured via the AOS 200 and ASS 400 in accordance with the preferences delineated in the TID 112 and are continuously optimised through time to ensure maximum utility to the end investor. In order to accurately measure the performance of each investment pool vis-à-vis initial expectations, and to place appropriate restrictions on what the AMS 500 can, and cannot, do in terms of either changes to the underlying contract terms, or with respect to the complexion of new tranches of assets that are introduced into open-ended funds, an investment mandate (hereafter "IM") will be designed by the AMS 500 and held by the AMD 502 based on the preferences supplied by the IID 102 and feedback received from the IMIPs 501.

The IM imposes constraints on the maximum exposures that the pool can have to any specific geographic region, consumer cohort or dwelling type, and the procedures by which new tranches of assets can be added. It also places precise limits on the nature of the changes that can be made to the consumer's cost of capital (practically encapsulated via the EFM's claim on the collateral asset's prospective price appreciation and depreciation), and the specific circumstances in which such changes can be made. Once computed by the AMS 500, the details of the IM are fed into the AMD 502, where the AMS 500 can dynamically interface with the IM and compare its parameters with the relevant secondary market metrics (e.g. the pool's price, trading volume, volatility, geographic weights, yield etc). To the extent that AMS 500 observes by way of its dynamic decision-rules any material divergences between these parameters, and the differentials exceed the pre-specified thresholds that determine the maximum acceptable limits that are set within the IM, the AMS 500 may have the right to undertake certain corrective actions.

In order to effect these actions, a feedback control mechanism is required to determine the size of the adjustments that must be made. For each pool characteristic that has a performance expectation or target, the AMS 500 controls the system to minimise the error between the target and actual characteristics. Target characteristics include the pool's yield, capital growth, relative performance, total return, trading volume, volatility, correlations, co-integrations, longitudinal diversification and consumer or asset specific attributes. The formula that will govern the feedback control is based on utilising a ratio of current errors, a ratio of historical errors, and the difference between the most current errors. This error feedback control algorithm is similar in nature to those outlined in (5) above and is constituted as follows:

$$p_n = \bar{p} + K_P e_n + K_I \frac{\Delta t}{\tau_I} \sum_{k=1}^{n-1} e_k + K_D \frac{\tau_D}{\Delta t}(e_n - e_{n-1}), \quad (25)$$

where all symbols have a comparable interpretation to those in equation (5) above. This formula is used to alter: the targets portfolio attributes that derive from the TID 112 to filter current applicants; the dynamic pricing of the contractual terms and conditions in response to inputted attributes from the MMIPs 201; and ex ante remuneration strategies structured to motivate the MMIPs 201 to issue contracts in accordance with expectations and the advertising programs, all of which have been discussed in detail previously. These adjustments can be based upon calibrating the parameters $K_P$, $K_I$, $K_D$, $\tau_I$ and $\tau_D$ for each of the target attributes to ensure that the errors in the controlled variable characteristics are minimized over time. The AMS 500 therefore employs a sophisticated model of process control whereby the tuning parameter values are determined either theoretically or by a combination of empirical and theoretical tuning.

The AMS 500 also uses feed-forward control in which it develops a model of the way the investors' experience in the pool will be altered by either AMS 500 actions or the behaviour of consumers. As an example, if the yield profile in one specific region is not consistent with that which was originally forecast through the TIS 100, the AMS 500 instructs the AServS 300 (indirectly via the AServD 302) to reduce the EFM's cost of capital amongst particular classes of households (e.g., first time buyers) for a finite period of time so as to stimulate higher trading activity. The key EFM terms and conditions that the AMS 500 can modify as a part of its ongoing portfolio management responsibilities include, but are not limited to, the EFM's: cost of capital (i.e. the X:Y:Z relation discussed previously); maximum term; renovation provision; refinancing provision; prepayment provision; and exit penalties.

Some of the broad portfolio construction and investment management issues that impact on the way in which the AMS 500 functions are now considered.

When investors submitted their initial requirements to the IID 102 (which executes them through interfaces with the cascade of dependent systems), they will have communicated many specific preferences with respect to key portfolio-level characteristics such as active versus passive exposures, the pools' yield profiles, the incidence of their tax liabilities, and longitudinal (or time) diversification as explained above. In turn, these specifications have implications for the current and future structure of the securitised pools. For example, the pools can be closed- or open-end, they can be leveraged by way of issuing debt and/or other specialised financial instruments, and they can be restructured into subsidiary securities that more accurately reflect the preferences of secondary-market participants. The primary tax, yield and diversification considerations are now described within the context of the types of activities that the AMS 500 is capable of undertaking.

6.1 Tax Structuring

In most jurisdictions there is a broad distinction drawn for taxation purposes between financial gains or losses sourced on capital account, and those sourced on revenue account. Where differences exist in the treatment of one vis-à-vis the other there are potential comparative advantages that exist in much the same way as they do in the context of gains from trade in international macroeconomic theory. Once the initial securitisation of the EFMs has taken place under the ASS 400, there exists the immediate potential for further subdivisions in accordance with the expectations of various tax clienteles as communicated directly through the IID 102, and the provisions made available to the AMS 500 under the IM.

By way of example, take the case of a single EFM. When the underlying home sells, the payoff on the contract will include a component that will accrue to the investor as return of principal and be taken for taxation purposes on capital account (the sum initially lent to the homeowner), as well as a further proportion of the price appreciation or depreciation on the home (depending on the performance of the underlying asset) that will accrue to the investor as income and be taken on revenue account. For a variety of reasons some investors have a relative preference for one form over the other. It is desirable for the AMS 500 to satisfy these preferences with more specific tax structures, and thereby improve the ability of the Overall System 600 to raise larger sums of capital in the investor market and therefore increase the ongoing quantum of funds available to consumers via the AOS 200 so as to alleviate the burdens which most home owners face. The easiest way for the AMS 500 to facilitate this process is to make a further (legal) restructuring of the rights attaching to each EFM by splitting them according to the two sources of financial gain (or loss) outlined immediately above. This is an automated procedure that is acceptable under the IM, and which is available to the AMS 500 in the event that the appropriate signals are received from the IID 102. The different sets of financial claims are then structured as entirely separate securities: one that has rights to all returns of principal, and another that has more risky rights to the appreciation or depreciation accruing on the contract. To the extent there are any relative preferences for one over the other, this allows and encourages a cross-subsidisation that increases the volume of funds that the AOS 200 can make available to consumers.

To illustrate via a crude example, whereas Investor 191A might have only been willing to pay $100 for a security that had claims to both sets of financial rights (i.e. principal, appreciation and depreciation), Investors 191A and 191B together are willing to pay $105 in total for the same combined package owing to their relative preferences and circumstances. This makes it easier to raise funds through the Overall System 600, and by doing so brings together these two disparate groups to achieve the objective providing equity capital. The algorithm the AMS 500 uses to give effect to these subsidiary structures is as follows:

Consider bundled investment preferences under the TID 112, assume that there are two for present purposes, which are designated A and B. Let the tax rate associated with each be $A_{CGT}$ and $B_{CGT}$ respectively. Similarly let the effective rates of income tax be denoted in a similar fashion $A_{IT}$ and $B_{IT}$. Then:

If $A_{CGT}-B_{CGT}>X$, where X is positive and real,
And $B_{IT}-A_{CGT}>Y$, where Y is positive and real,
then instructions are sent by the AMS 500 to the AMD 502 to split the security into subsidiary securities as outlined above, Else, if $A_{CGT}-B_{CGT}>X'$, where X' is positive and real,
And $A_{IT}-B_{IT}>Y'$, where $Y'=X'+Z$, Z is positive and real,
then instructions are sent by the AMS 500 to the AMD 502 to split the security into subsidiary securities as outlined above.

Else, bypass the process.

After the initial securitisation, any future preferences that are submitted to the IID 102 regarding idealised tax structures (e.g. in light of regulatory changes) are dynamically reviewed by the AMS 500 and if they satisfy the constraints stipulated by the IM while triggering the appropriate thresholds, instructions are transmitted back from the AMS to the IID 102 regarding future pool disaggregation by the ASS 400 on the basis of these preferences.

6.2 Yield Profile

The term "yield" is used to refer to cash payments made by the pools or similar investment vehicles to their long-term holders over time (technically, this may described as the cash payment divided by the fund value). Some investors have a preference for higher yields generally, or higher yields at particular times, while other investors have a preference for the alternative (that is, they would prefer that payments were reinvested by the pool and their returns realised in the form of growth in the value of the pool). Similarly, some investors have a preference for less volatile yields while others prefer specific yields at particular times, perhaps to match other liabilities to which they are subject. Of course, one needs to distinguish yield preferences driven by tax considerations from those yield preferences that are purely motivated by expectations regarding the timing of the future cash receipts.

To give a relatively straightforward example, pension funds paying complying annuities are in need of a steady and predictable stream of cash flows to match the revenues of their investment management businesses with their liabilities to unit holders (e.g. pensioners). These funds would likely have a preference for stable yields over the life of the investment. By way of contrast, superannuation funds with no immediate liabilities might display a fairly strong preference for little to no yield since cash distributions paid out on the underlying securities (receipts in the hands of the superannuation funds) would need to be reinvested, presumably incurring transaction costs on the way, and not necessarily in an asset class with equivalent performance characteristics. High yields in this context are seen as a significant performance leakage. There are number of ways in which the Overall System 600 can manage these problems, both in the ASS 400 structuring of the pool immediately prior to the securitisation event, and thereafter at the secondary-market portfolio level, in which case the burden of responsibility falls on the AMS 500.

Perhaps the most obvious example of matching yield preferences at either of the two junctions is for either the ASS 400 or AMS 500 to provide a straight swap facility between the two parties that have yield preferences at disparate ends of the spectrum (this action would of course be based on the integrity of the original investor information fed to the ASS 400 or AMS 500 via the IID 102, and any constraints imposed on the AMS to undertake such activities, as determined by the IM). Clearly if one investor prefers yield and the other prefers capital gain (for reasons other than taxation) there are gains from trade to be had if the two can arrive at a mutually agreeable price. One way to do this is for the ASS 400 or AMS 500 to engineer a simple transfer by one investor to the other, whereby the investor 191A with yield preferences would "acquire" the yield from the other investor 191B in return for exchanging some of the underlying units of investor 191B in the fund (a "swap"). In terms of codifying whether a yield preference transaction should be undertaken, the following decision steps may be undertaken:

If $Yield_A-Yield_B>X$, then offer a dividend for a capital swap to investors 191A and 191B where $Yield_A$ and $Yield_B$ are the yield preferences for investors 191A and 191B and X is the differential preference tolerance parameter.

For investors who prefer a relatively stable yield over the life of the pool, a reasonably straightforward mechanism to raise the yield in years when it is low is through the introduction of debt (or leverage), which can be paid back when yields are higher. Once again, the ability of the AMS 500 to execute such intentions is based on any constraints imposed on it by the IM. Assuming that the IM stipulates an acceptable debt-to-equity ratio, there are a variety of forms of debt which the AMS 500 can instruct the ASS 400 to introduce in order to smooth the pool's distributions over time. In each case, the pool effectively borrows from debt providers to pay equity participants in the years when yields are low, and agrees to repay the debt plus interest back later at times when yields are comparatively high. Provided equity investors do not attribute too much risk to the increased leverage, the process of having the AMS 500 and ASS 400 re-engineer the cash flows in a manner more in line with their preferences is significantly value accretive. The formulaic interpretation of the above is:

If Target Yield−Actual Yield>X where X is the investor tolerance, then introduce debt. The quantum of debt finance to be introduced is bounded by the investment mandate. The target quantum of debt finance to be introduced is sufficient to ensure the near term Target Yield−Actual Yield=0.

To demonstrate by way of a very simple example, assume that a single pool contains only one EFM and it is known that the home underlying this EFM will sell in two years (in a well diversified and statistically large enough pool the capacity to predict the timing and value of future sales is high). Suppose also that the face value of the contract on day one is $100. Let us assume that at the end of year 2 the contract is going to return $100 of principal and $20 of appreciation with reasonable certainty. At the end of the year 1 a closed-end pool with no leverage would return zero yield (that is, it would not pay a distribution to the investor at the end of that year). Now consider the following alternative scenarios. At the end of year 1 the pool borrows $5 as debt at the rate of 10% per annum payable in 1 year. It passes the $5 through to the investor as a distribution. At the end of the year 2 the pool pays back $5.50 ($0.50 in interest) and pays the investor the remaining $114.50. It is not difficult to see that the introduction of debt has smoothed the yield over these two years.

Another way in which debt can be introduced into the pools is by simply borrowing on day one and buying more assets. Assuming that the cost of debt is lower than the total return generated by the underlying pool, such an approach increases the expected yield (and capital appreciation) of the pool over its useful life. This procedure, when combined with the mechanism outlined above, can raise and smooth the pool's yield at times when investors have exhibited a preference for such.

A suite of derivative products based on the underlying EFM contracts can also be engineered by the ASS 400 or the AMS 500. In much the same manner as the simple example above, this would allow the cash flows accruing to investors to be structured in a manner that is more sympathetic to their preferences. For example, some investors who do not wish to take the risk on the volatility associated with the yield can enter into a "fixed-for-floating" swap with a third-party institution where the ASS 400 or the AMS 500 provides the intermediating services. That is to say, an external derivative provider is prepared to take the risk associated with fluctuations in yield and pay the underlying investor in the pool (who retains rights to all returns of principal) a fixed yield per period. Investors who do not wish to take any risk at all may find it beneficial to enter into a "total return swap". These instruments are well known in financial markets dealing with other underlying assets, but are yet to be developed in relation to financial securities that comprise packaged EFMs. The general economic terms of a total return swap are quite straightforward. One party takes all the risk associated with the return for a price—the return paid to the counterparty (which is generally lower than the expected return, the difference being the premium accruing to the first party who has agreed to bare all the risk).

In summary, the yield preferences of investors are processed by the ASS 400 and AMS 500 through the interface of these systems with the AMD 502, IID 102 and TID 112 in a similar vein to that in which the more efficient tax structures were developed. However, rather than splitting financial rights as in the case of the tax methods above, new financial claims (such as debt) are added to the pools at various stages in order to accede to the wishes of investors. This can take place immediately prior to the securitisation, in which case the transaction is managed exclusively by the ASS 400, or subsequent to this date, in which case the transaction is motivated by instructions relayed by the AMS 500, subject to any IM constraints.

6.3 Longitudinal Diversification

While the diversification benefits accruing to investors in the pools administered by the AMS 500 are in part crystallized via the asset-selection and securitisation processes, there are potentially significant gains to be obtained in an open-end framework through the continuous and selective introduction of new tranches of assets. The benefits accruing in this regard are twofold: (1) cross-sectional diversification owing purely to the increased size of the pool (which will impact the pool's risk-return profile on three dimensions: (i) the number and type of underlying properties (e.g. detached, semi-detached, and apartments); (ii) the number and type of households (e.g. first time buyers, dwellers in their middle years, and elderly homeowners); and, (iii) the number of geographic regions in which those households and their properties are located (e.g. Sydney, Melbourne, Brisbane, Adelaide, and Perth)); and (2) time-series diversification by way of originating new bundles of assets during different time periods (for example, in year 1, the ASS 400 may place 10,000 EFMs into an open-end pool; in year 2, the AMS 500 may instruct the ASS 400 to add another 10,000 contracts (and hence 10,000 properties); in year 3, the process may continue, and so on. In such situations, the investors' reliance on property valuations in one specific year (e.g. year 1) is materially attenuated by continuously adding new tranches of assets that were originated in subsequent periods (e.g. years 1, 2, 3, . . . , N).

It is expected that investors will select their broad investment style (e.g. open-end or closed-end, and the extent to which they would like cross-sectional and time-series diversification) through the IID 102, which is linked to the TIS 100, and through this system, the TID 112. On the other hand, there will be opportunities for certain classes of investors to, in effect, construct their own personal portfolios, and determine the pool's specific weights to various dwelling types, consumer cohorts and geographic regions. In the funds management industry, this would be akin to a "specialist" wholesale investment mandate, wherein the investment vehicle's characteristics are specifically tailored to suit the preferences of one particular institution. This subject was examined in more detail in the present applications discussion of the TIS 100.

For investors who submitted a preference for ongoing time-series diversification through the IID 102, their initial and updated preferences are stored in this database, and communicated to the TID 112 which interfaces directly with the AMS 500. If investors in an existing secondary-market pool wish for new tranches of assets to be added to their fund, then the AMS 500 will learn of these expectations through the same process, which will then transmit the investors' instructions through to the ASS 400 such that additional packages of contracts are introduced to the existing pool, rather than simply placing them into a fresh structure or vehicle. As before, the activities of the AMS 500 will be bounded by any restrictions imposed by the IM, which it interfaces with through the AMD 302. The algorithm the AMS uses to give effect to these preferences can be structured along the following broad lines:

Lookup TID 112,
If longitudinal diversification preferences="yes",
Then lookup AMD 502, longitudinal diversification preferences,
Output AMD 502 to existing pool (also stored in a cell in the AMD 502)
Else if longitudinal preferences="no",
Then bypass process
Do loop.

SUMMARY OF ACRONYMS

| AMS | 500 | Asset Management System |
| --- | --- | --- |
| AMD | 502 | Asset Management Database |
| AOD | 202 | Asset Origination Database |
| AOS | 200 | Asset Origination System |
| AServS | 300 | Asset Servicing System |
| AServD | 302 | Asset Servicing Database |
| ASIP | 301 | Asset Servicing Information Provider |
| ASS | 400 | Asset Securitisation System |
| AWD | 210 | Asset Warehouse Database |
| IID | 102 | Investment Information Database |
| IIP | 101 | Investment Information Providers |
| IMIP | 501 | Investor Market Information Provider |
| MMIP | 201 | Mortgage Market Information Provider |
| TID | 112 | Target Investment Database |
| TIS | 100 | Target Investment System |
| UCPs | 211 | Underwriting Capital Providers |

Figure 3:
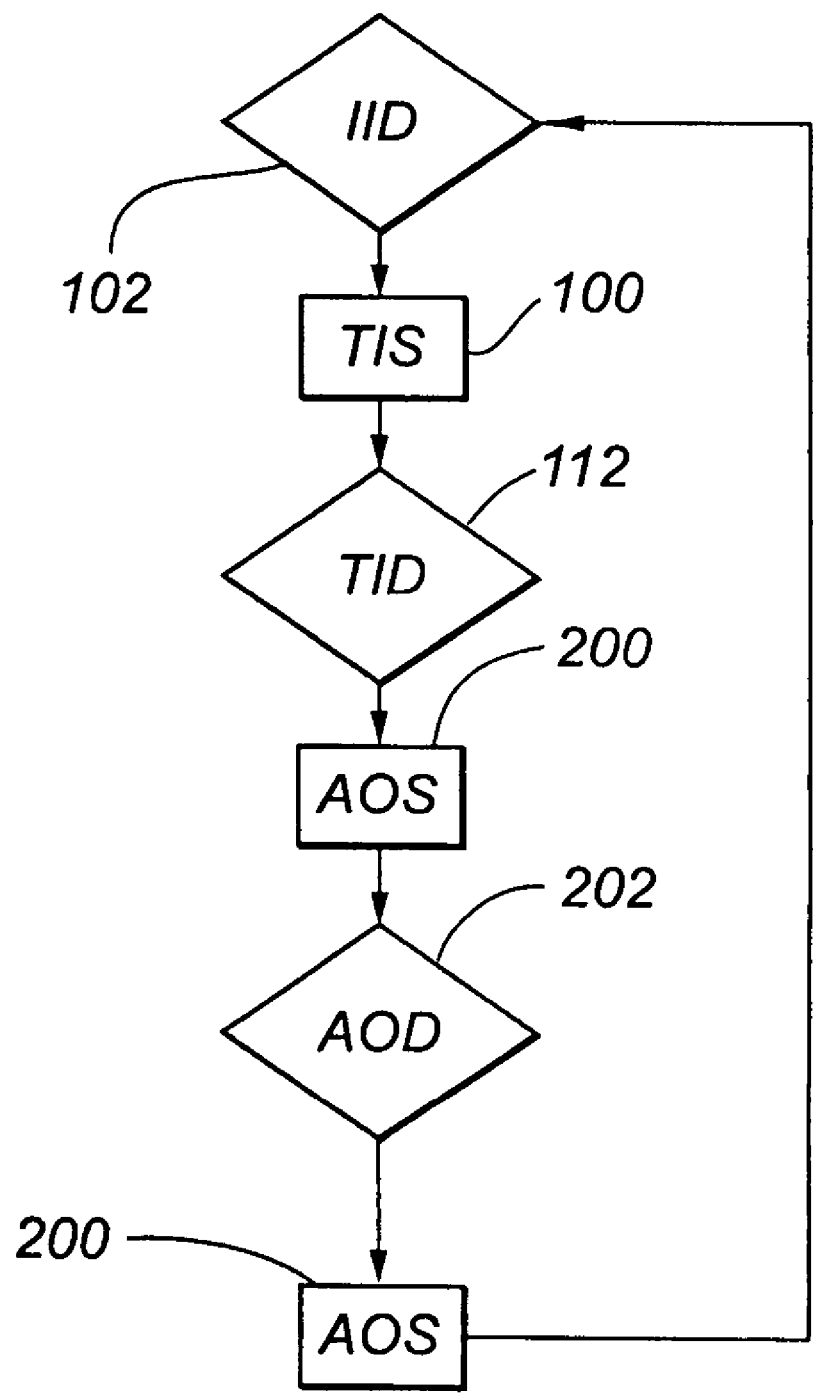
FIG. 3 is a feedback loop extracted from FIG. 2.
Figure 5:
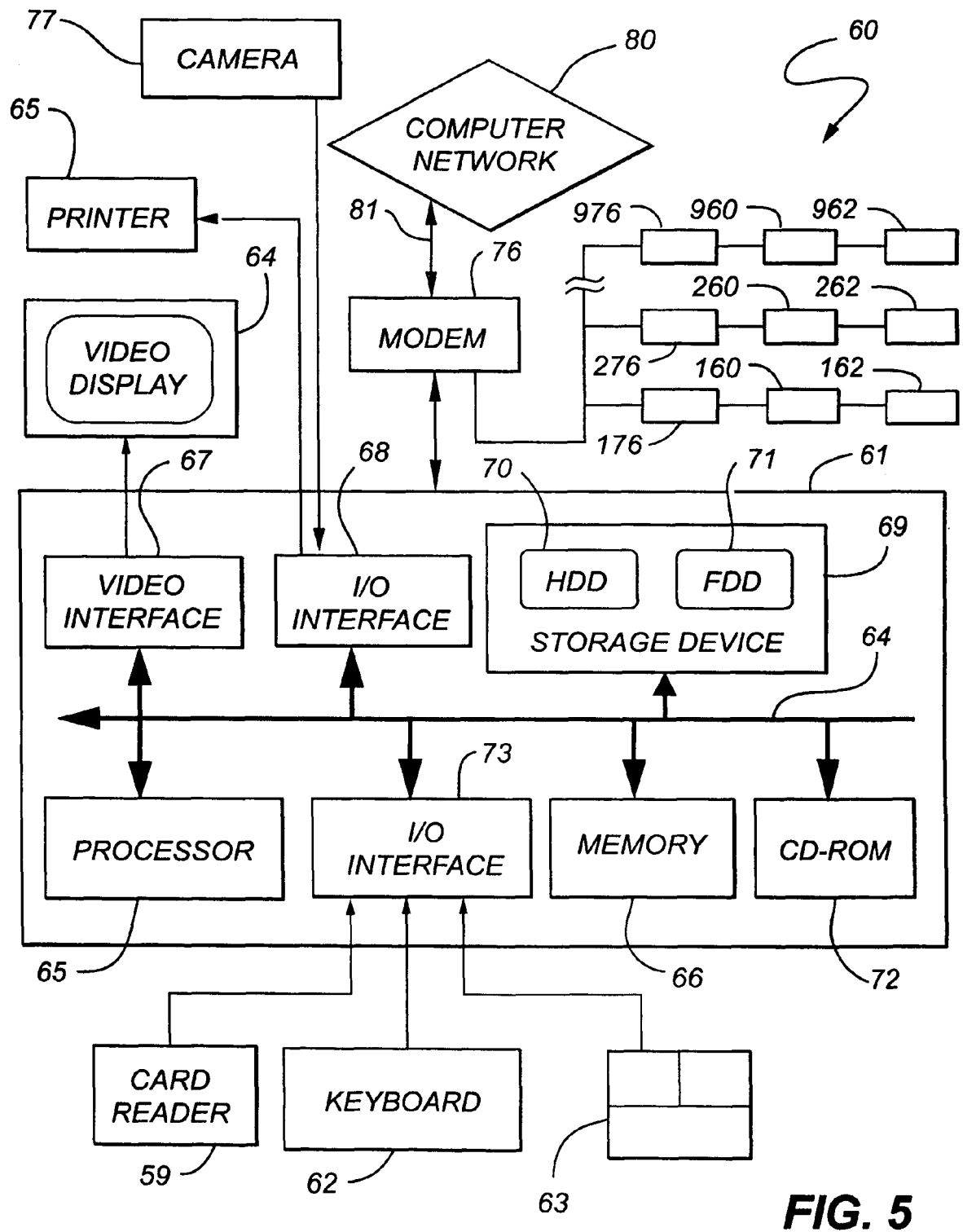
FIG. 5 is a block diagram of a computer system upon which the methods and systems of the preferred embodiments can be implemented.

The methods and processes described above in relation to FIGS. 2, 3 and 4 are preferably practised using a conventional general-purpose computer system 60, such as that shown in FIG. 5 wherein the processes are implemented as software, such as an application program executed within the computer system 60. In particular, the steps of the processes are effected by instructions in the software that are carried out by the computer. The software can be divided into two separate parts; one part for carrying out the specific processes; and another part to manage the user interface between the latter and the user. The software is able to be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for carrying out embodiments of the invention.

The computer system 60 comprises a computer module 61, input devices such as a keyboard 62 and mouse 63, output devices including a printer 65 and a display device 64. A Modulator-Demodulator (Modem) transceiver 76 is used by the computer module 61 for communicating to and from a communications network 80, for example connectable via a telephone line 81 or other functional medium. The modem 76 can be used to obtain access to the Internet, and other network systems, such as a Local Area Network (LAN) or a Wide Area Network (WAN) or other computers 160, 260, . . . 960, etc each with their own corresponding modem 176, 276, . . . 976, etc and each having a data input terminal 162, 262, . . . 962, etc. Each of the computers 160-960 are operated by an MMIP 201, for example.

The computer module 61 typically includes at least one processor unit 65, a memory unit 66, for example formed from semiconductor random access memory (RAM) and read only memory (ROM). There are input/output (I/O) interfaces including a video interface 67, and an I/O interface 73 for the keyboard 62, mouse 63 and optionally a card reader 59, and a further interface 68 for the modem 76 or optionally a camera 77. A storage device 69 is provided and typically includes a hard disk drive 70 and a floppy drive 71. A magnetic tape drive (not illustrated) can also be used. A CD-ROM drive 72 is typically provided as a non-volatile source of data. The components 65 to 73 of the computer module 61, typically communicate via an interconnected bus 64 and in a manner which results in a conventional mode of operation of the computer system 60 known to those in the relevant art. Examples of computers on which the embodiments can be practiced include IBM-PC's and compatibles, Sun Sparcstations or alike computer systems evolved therefrom.

Typically, the application program of the preferred embodiment is resident on the hard disk drive 70 and read and controlled in its execution by the processor 65. Intermediate storage of the program and any data from the network 80 is accomplished using the semiconductor memory 66, possibly in concert with the hard disk drive 70. In some instances, the application program is encoded on a CD-ROM or floppy disk and read via the corresponding drive 72 or 71, or alternatively is read from the network 80 via the modem device 76. Still further, the software can also be loaded into the computer system 60 from other computer readable media including magnetic tape, a ROM or integrated circuit, a magneto-optical disk, a radio or infra-red transmission channel between the computer module 61 and another device, a computer readable card such as a PCMCIA card, and the Internet and Intranets including email transmissions and information recorded on websites and the like. The foregoing is merely exemplary of relevant computer readable media. Other computer readable media may be practiced without departing from the scope and spirit of the invention.

Figure 6:
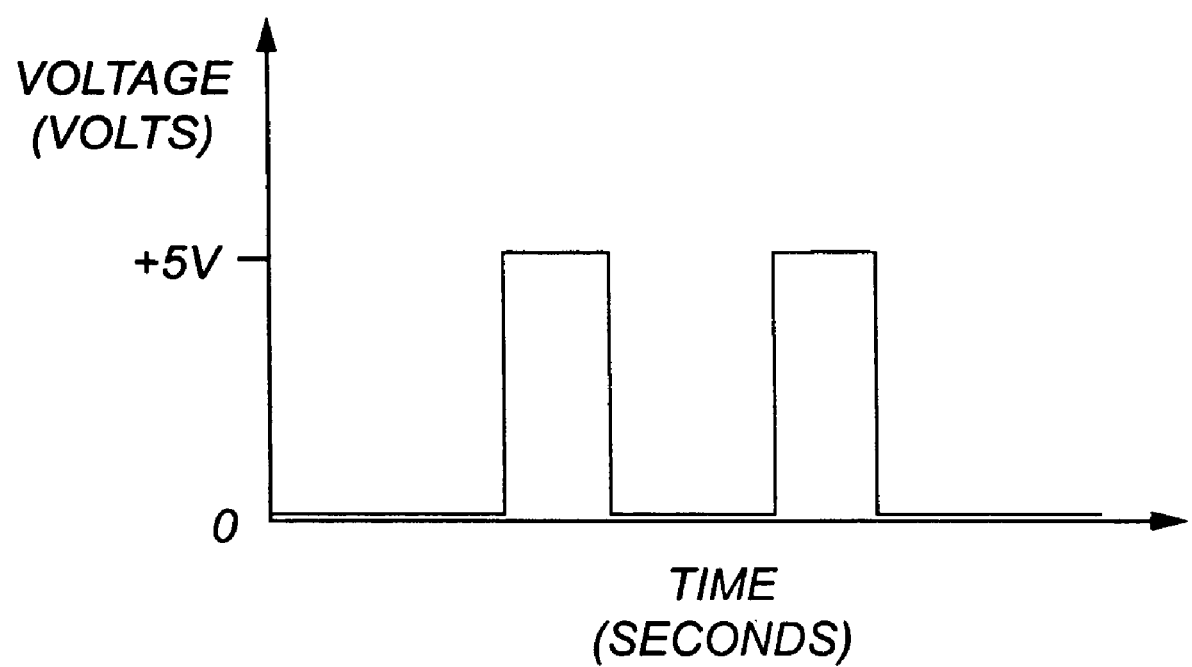
FIG. 6 is a graph of a representative digitally encoded electronic signal.

It should not be lost sight of that the purpose of the computer system 60 is to generate a digitally encoded electric signal (such as that illustrated in FIG. 6) which when applied to an output interface (such as the display device 64 or the printer 65) produces an indicium or indicia which convey information and which are legible or intelligible to a human. For example, the electric signal illustrated in FIG. 6 is a binary encoded signal 01001 which when applied to the display device 64 or printer 65 causes the indicium 9 to be displayed or printed.

The processes can alternatively be implemented in dedicated hardware such as one or more integrated circuits performing the functions or sub functions of the processes. Such dedicated hardware can include graphic processors, digital signal processors, or one or more microprocessors and associated memories.

The foregoing describes only one embodiment of the present invention and modifications, obvious to those skilled in the financial and computing arts, can be made thereto without departing from the scope of the present invention.

The term "comprising" (and its grammatical variations) as used herein is used in the inclusive sense of "including" or "having" and not in the exclusive sense of "consisting only of".

The invention claimed is:

1. A data processing system to enable an entity to use a range of decision-rules to evaluate in real time or on a batch basis applications from consumers to enter into financial arrangements with a mortgage financing entity for shared equity mortgage finance in which a residential real estate asset is used as collateral and the mortgage financing entity derives its returns from a capital value of the residential real estate asset used as collateral, with an ultimate objective of said entity accepting or rejecting those applications, said system comprising:

(i) at least one data input terminal in which is input data characterizing unaccepted or unrejected applications for shared equity mortgage finance from said mortgage financing entity which derives its returns from the capital value of the residential real estate asset used as collateral for said shared equity mortgage finance and relating to both a consumer and the shared equity mortgage finance applied for in said unaccepted or unrejected applications, (ii) a data processing means connected with the at least one data input terminal, and (iii) a data storage means connected with said data processing means and containing both initial portfolio data relating to said applications accepted to date which collectively characterise a financial portfolio of accepted applications of said mortgage financing entity, and desiderata data relating to desired characteristics of said portfolio, wherein, prior to acceptance or rejection of unaccepted or unrejected application(s), said data processing means:

amalgamates said input data relating to said unaccepted or unrejected application(s) and said portfolio data to produce a modified portfolio data representative of said portfolio if said unaccepted or unrejected application(s) were accepted, compares said modified portfolio data with said desiderata data, and signals acceptance of said unaccepted or unrejected application(s) only if the difference between said desiderata data and said modified portfolio data is less than the difference between said desiderata data and said initial portfolio data and otherwise signals rejection of said application(s) for said shared equity mortgage finance;

wherein a financial arrangement comprises: an advance of funds by the mortgage financing entity to the consumer equal to a first percentage of the value of said asset, and one of a group consisting of:
  (i) an undertaking by the consumer to repay the mortgage financing entity said advance of funds plus a second percentage of any increase in, or less a third percentage of any decrease in, the value of said asset in the event that at least one predetermined state arises,
  (ii) an undertaking by the consumer to repay the mortgage financing entity said advance of funds plus or minus said second and third percentages respectively, plus a fourth percentage of the value of said asset on a recurring basis throughout the life of the financial arrangement,
  (iii) an undertaking by the consumer to repay the mortgage financing entity said advance of funds plus or minus said second and third percentages respectively, plus a supplementary payment related to standard variable or fixed interest rates on a recurring basis throughout the life of the financial arrangement,
  (iv) an undertaking by the mortgage financing entity to compensate said consumer by way of set off for the value of improvements made to said asset, and
  (v) a provision allowing said consumer to refinance any higher priority financial arrangement based on formula/(e) preserving value of the lower priority financial arrangement to the mortgage financing entity.

2. The system as claimed in claim 1 wherein said second percentage is larger or smaller than said third percentage.

3. The system as claimed in claim 1 wherein said third percentage is equal to zero.

4. The system as claimed in claim 1 wherein said first and third percentages are equal.

5. The system as claimed in claim 1 wherein said second and third percentages vary subject to a predetermined state.

6. The system as claimed in claim 5 wherein said predetermined state is selected from the group consisting of: the attainment of a predetermined economic condition or the effluxion of a predetermined time.

7. The system as claimed in claim 1 wherein said second and third percentages are fixed until a predetermined time or state is achieved.

8. The system as claimed in claim 7 wherein said predetermined state is selected from the group consisting of: the attainment of a predetermined economic condition or the effluxion of a predetermined time.

9. The system as claimed in claim 1 wherein said first percentage, said second percentage and said third percentage are in the ratio of 1:2:1.

10. The system as claimed in claim 1 wherein said first percentage, said second percentage and said third percentage are in the ratio of 1:1:1.

11. The system as claimed in claim 1 wherein said first percentage, said second percentage and said third percentage are in the ratio of 1:1.5:0.

12. The system as claimed in claim 1 wherein said predetermined state is a sale by the consumer of the asset.

13. The system as claimed in claim 1 wherein said predetermined state is selected from a group consisting of: an effluxion of a predetermined time, a death of the consumer, an attainment of a predetermined economic condition, or a voluntary election of the consumer at any time prior to an expiry of said financial arrangement.

14. The system as claimed in claim 1 wherein said predetermined time is selected from a group consisting of any integer number of months or years.

15. A computer-implemented method of accepting, rejecting or referring in real time or on a batch basis applications from consumers to a mortgage financing entity for a financial arrangement in which a residential real estate asset is used as collateral and the mortgage financing entity derives its returns from a capital value of the residential real estate asset used as collateral, said method comprising the steps of:
  (i) inputting into a data input terminal data characterizing one or more unaccepted or unrejected application(s) for shared equity mortgage finance from said mortgage financing entity which derives its returns from the capital value of the residential real estate asset used as collateral for said shared equity mortgage finance and relating to both a consumer and said shared equity mortgage finance applied for in said unaccepted and unrejected application(s), said data input terminal being connected to a data processing means to which is connected a data storage means,
  (ii) storing in said data storage means both initial portfolio data relating to said applications accepted to date which collectively characterise a financial portfolio of accepted applications of said mortgage financing entity, and desiderata data relating to desired characteristics of said portfolio,
  (iii) prior to acceptance or rejection of said unaccepted or unrejected application(s), amalgamating, using said data processing means, said input data relating to said unaccepted or unrejected application(s) and said initial portfolio data relating to said applications accepted to date to produce a modified portfolio data representative of said financial portfolio if said unaccepted or unrejected application(s) were accepted,
  (iv) comparing, using said data processing means, said modified portfolio data with said desiderata data, and
  (v) accepting, using said data processing means, said unaccepted or unrejected application(s) only if the difference between said desiderata data and said modified portfolio data is less than the difference between said desiderata data and said initial portfolio data and otherwise rejecting said application(s) for said shared equity mortgage finance;
wherein said financial arrangement comprises: an advance of funds by the mortgage financing entity to the consumer equal to a first percentage of the value of said asset, and one of a group consisting of:
  (i) an undertaking by the consumer to repay the mortgage financing entity said advance of funds plus a second percentage of any increase in, or less a third percentage of any decrease in, the value of said asset in the event that at least one predetermined state arises,
  (ii) an undertaking by the consumer to repay the mortgage financing entity said advanced of funds plus or minus said second and third percentages respectively, plus a fourth percentage of the value of said asset on a recurring basis throughout the life of the financial arrangement,
  (iii) an undertaking by the consumer to repay the mortgage financing entity said advance of funds plus or minus said second and third percentages respectively, plus a supplementary payment related to standard variable or fixed interest rates on a recurring basis throughout the life of the financial arrangement, (iv) an undertaking by the mortgage financing entity to compensate said consumer by way of set off for the value of improvements made to said asset, and (v) a provision allowing said consumer to refinance any higher priority financial arrangement based on formula/(e) preserving value of the lower priority financial arrangement to the mortgage financing entity.

16. The computer-implemented method as claimed in claim 15 wherein said second percentage is larger or smaller than said third percentage.

17. The computer-implemented method as claimed in claim 15 wherein said third percentage is equal to zero.

18. The computer-implemented method as claimed in claim 15 wherein said first and third percentages are equal.

19. The computer-implemented method as claimed in claim 15 wherein said second and third percentages vary subject to a predetermined state.

20. The computer-implemented method as claimed in claim 19 wherein said predetermined state is selected from the group consisting of: the attainment of a predetermined economic condition or the effluxion of a predetermined time.

21. The computer-implemented method as claimed in claim 15 wherein said second and third percentages are fixed until a predetermined time or state is achieved.

22. The computer-implemented method as claimed in claim 21 wherein said predetermined state is selected from the group consisting of: the attainment of a predetermined economic condition or the effluxion of a predetermined time.

23. The computer-implemented method as claimed in claim 15 wherein said first percentage, said second percentage and said third percentage are in the ratio of 1:2:1.

24. The computer-implemented method as claimed in claim 15 wherein said first percentage, said second percentage and said third percentage are in the ratio of 1:1:1.

25. The computer-implemented method as claimed in claim 15 wherein said first percentage, said second percentage and said third percentage are in the ratio of 1:1.5:0.

26. The computer-implemented method as claimed in claim 15 wherein said predetermined state is a sale by the consumer of the asset.

27. The computer-implemented method as claimed in claim 15 wherein said predetermined state is selected from a group consisting of: an effluxion of a predetermined time, a death of the consumer, an attainment of a predetermined economic condition, or a voluntary election of the consumer at any time prior to an expiry of the financial arrangement.

28. The computer-implemented method as claimed in claim 15 wherein said predetermined time is selected from a group consisting of any integer number of months or years.

* * * * *